United States Patent
Lee et al.

(10) Patent No.: US 11,003,280 B2
(45) Date of Patent: May 11, 2021

(54) SWITCHING OPERATION SENSING APPARATUS WITH LOW-POWER DUAL-SENSING STRUCTURE

(71) Applicant: Samsung Electro-Mechanics Co., Ltd., Suwon-si (KR)

(72) Inventors: Soo Woong Lee, Suwon-si (KR); Joo Yul Ko, Suwon-si (KR); Je Hyuk Ryu, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/807,308

(22) Filed: Mar. 3, 2020

(65) Prior Publication Data

US 2021/0019014 A1 Jan. 21, 2021

(30) Foreign Application Priority Data

Jul. 18, 2019 (KR) .......................... 10-2019-0087206
Oct. 28, 2019 (KR) .......................... 10-2019-0134345

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 2203/04106* (2013.01)

(58) Field of Classification Search
CPC ..................... G06F 3/044; G06F 3/046; G06F 2203/04107; G06F 2203/04114
See application file for complete search history.

(56) References Cited

U.S. PATENT DOCUMENTS

| | | | | |
|---|---|---|---|---|
| 10,768,723 B2* | 9/2020 | Katsurahira | ........ | G06F 3/03545 |
| 10,790,824 B1* | 9/2020 | Ryu | ........................ | G06F 3/044 |
| 10,809,846 B2* | 10/2020 | Kurasawa | ........... | G02F 1/13439 |
| 2004/0105040 A1* | 6/2004 | Oh | ....................... | G02F 1/13338 |
| | | | | 349/12 |

(Continued)

FOREIGN PATENT DOCUMENTS

| | | | | |
|---|---|---|---|---|
| CN | 101419522 A | * | 4/2009 | ........... G06F 3/0416 |
| JP | 2012-168747 A | | 9/2012 | |

(Continued)

*Primary Examiner* — Chad M Dicke
(74) *Attorney, Agent, or Firm* — NSIP Law

(57) ABSTRACT

A switching operation sensing apparatus includes an input operation unit including a first detector integrally formed with a housing; a current variable oscillation circuit generating an oscillation signal having a frequency that varies based on a change in a capacitance from a human body touch on the operating unit, or a change in an inductance from a non-human body touch on the operating unit, and regulate an operating current in response to a control signal; an input operation detection circuit identifying the touch to be from the human body touch, and identifying the touch to be from the non-human body touch based on characteristics of the varied frequency, and generating detection signals having different levels based on the identification of the touch; and a control circuit that determines a sensing manner based on the detection signals and generating the control signal current based on the determined sensing manner.

20 Claims, 17 Drawing Sheets

(56) References Cited

U.S. PATENT DOCUMENTS

| | | | |
|---|---|---|---|
| 2011/0216032 A1* | 9/2011 | Oda | G06F 3/044 |
| | | | 345/174 |
| 2011/0227868 A1* | 9/2011 | Chen | G06F 3/044 |
| | | | 345/174 |
| 2012/0306824 A1* | 12/2012 | Horie | G06F 3/046 |
| | | | 345/179 |
| 2013/0021291 A1* | 1/2013 | Kremin | G06F 3/0416 |
| | | | 345/174 |
| 2015/0035793 A1* | 2/2015 | Hirotsune | G06F 3/0416 |
| | | | 345/174 |
| 2015/0035794 A1* | 2/2015 | Zhitomirskiy | G06F 3/044 |
| | | | 345/174 |
| 2015/0130649 A1 | 5/2015 | Itakura et al. | |
| 2015/0145578 A1* | 5/2015 | Araki | H03L 7/081 |
| | | | 327/241 |
| 2018/0093695 A1 | 4/2018 | Hattori et al. | |
| 2018/0120364 A1 | 5/2018 | Lee et al. | |
| 2018/0181222 A1* | 6/2018 | Ivanov | G01J 3/0272 |

FOREIGN PATENT DOCUMENTS

| | | |
|---|---|---|
| JP | 2015-95865 A | 5/2015 |
| KR | 10-2002-0077836 A | 10/2002 |
| KR | 10-2009-0120709 A | 11/2009 |
| KR | 10-2011-0087004 A | 8/2011 |
| KR | 10-2011-0087014 A | 8/2011 |
| KR | 10-2018-0046833 A | 5/2018 |

\* cited by examiner

Example Where There is No Touch

Example Where There Is a Touch by Human Body

SWITCHING OPERATION SENSING APPARATUS WITH LOW-POWER DUAL-SENSING STRUCTURE

CROSS-REFERENCE TO RELATED APPLICATIONS

This application claims the benefit under 35 USC 119(a) of Korean Patent Application No. 10-2019-0087206 filed on Jul. 18, 2019, and Korean Patent Application No. 10-2019-0134345 filed on Oct. 28, 2019 in the Korean Intellectual Property Office, the entire disclosures of which are incorporated herein by reference for all purposes.

BACKGROUND

1. Field

The following description relates to a switching operation sensing apparatus with low-power dual sensing.

2. Description of Related Art

It is typically beneficial that wearable devices have a thinner, simpler, and cleaner design. Accordingly, existing mechanical switches are being utilized less in view of the implementation of dustproof and waterproof technology, and the development of models with a smooth design and a sense of design unity.

For the purpose of this implementation and development, technology such as touch on metal (ToM) technology that performs a touch on a metal, capacitor sensing technology that implements a touch panel, a micro-electro-mechanical-system (MEMS), a micro strain gauge, or similar technology, is currently being developed. Furthermore, a force touch function is being developed.

Existing mechanical switches may require a large size and internal space in order to implement switching functions. The existing mechanical switches may also have a cluttered design, and may utilize a large amount of space because of a form in which the existing mechanical switch protrudes outwardly, a structure in which the existing mechanical switch is not integrated with an external case, or the like, in terms of appearance.

Additionally, there is a risk of an electric shock if direct contact is made with an electrically connected mechanical switch, and particularly, it may be difficult to implement a dustproof function and a waterproof function due to a current structure of the mechanical switch.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a switching operation sensing apparatus includes an input operation unit comprising a first detector integrally formed with a housing; a current variable oscillation circuit configured to generate an oscillation signal having a frequency that varies based on a change in a capacitance from a touch on a surface of the input operation unit by a human body, or a change in an inductance from a touch on the surface of the input operation unit by a non-human body, and regulate an operating current in response to a control signal; an input operation detection circuit configured to identify the touch to be from the human body touch, and identify the touch to be from the non-human body touch based on characteristics of the varied frequency, and generate detection signals having different levels based on the identification of the touch; and a control circuit configured to confirm a capacitive sensing or an inductive sensing based on the detection signals and generate the control signal to regulate the operating current based on the confirmed capacitive sensing or the confirmed inductive sensing.

The operation detection circuit may include a frequency digital converter configured to convert the oscillation signal into a count value; and a touch detection circuit configured to identify the human body touch and identify the non-human body touch based on the count value, and generate the detection signals having the different levels based on the identification of the touch.

The frequency digital converter may be further configured to generate the count value by counting a reference clock signal based on the oscillation signal.

The input operation unit may further include a second detector integrally formed with the housing, and disposed at a position different from a position of the first detector, and wherein the first detector and the second detector may be formed of a same material as a material of the housing.

The current variable oscillation circuit may include a current regulator configured to regulate the operating current in response to the control signal; and an oscillator configured to receive the regulated operating current, generate an oscillation signal having a first frequency characteristic wherein a resonance frequency rises and then falls when the first detector is touched by the human body, and generate an oscillation signal having a second frequency characteristic wherein a resonance frequency rises and then falls when the first detector is touched by the non-human body object.

The oscillator may include an inductance circuit comprising a first coil element disposed inside the first detector and having an inductance that varies when the non-human body touch is input to the first detector; and a capacitance circuit comprising a capacitor element connected to the inductance circuit and having a capacitance that varies when the human body touch is input to the first detector.

The current regulator may include a first inverter circuit connected to the oscillator, having a first gm-cell, and enabled at a time of the touch from the human body; a second inverter circuit connected in parallel with the first inverter circuit, having a second gm-cell larger than the first gm-cell, and enabled at a time of the touch from the non-human body; a first resistor connected between a connection node between the first inverter circuit and the second inverter circuit and a first end of the oscillator; and a first switch connected in parallel with the first resistor, wherein the first switch is turned off at the time of the touch from the human body, and turned on at the time of the touch from the non-human body.

The current regulator may include a mirror transistor and a current source connected between a terminal of a power supply voltage and a ground, the mirror transistor may be connected between the terminal of the power supply voltage and the current source to form a current mirror with the oscillator, and the current source may be connected between the terminal of the power supply voltage and the mirror transistor, or between the mirror transistor and the ground, and generates a variable current based on the control signal.

The current regulator may include an amplitude detection circuit configured to detect amplitudes of differential signals of the oscillator and output first and second detected voltages; and an error amplifier circuit configured to control the operating current of the oscillator based on an error voltage between the first and second detected voltages of the amplitude detection circuit.

The amplitude detection circuit may include a first amplitude detection circuit configured to detect an amplitude of a positive signal of the differential signals of the oscillator and output the first detected voltage from a common source of first and second N-channel field effect transistors (FETs); and a second amplitude detection circuit configured to detect an amplitude of a negative signal of the differential signals of the oscillator and output the second detected voltage from a common source of first and second P-channel FETs.

The frequency digital converter may be configured to divide a reference frequency signal based on a reference frequency dividing ratio to generate a divided reference clock signal; divide the oscillation signal from the current variable oscillation circuit based on a sensing frequency dividing ratio; and output a count value generated by counting the divided reference clock signal using the divided oscillation signal.

The frequency digital converter may include a frequency down converter configured to receive a reference frequency signal as a reference clock signal, divide the reference clock signal based on a reference frequency dividing ratio to generate a divided reference clock signal, and down-convert a frequency of the reference frequency signal; a period timer configured to receive the oscillation signal as a sample clock signal and output a period count value generated by counting one period time of the divided reference clock signal received from the frequency down converter using the sample clock signal; and a cascaded integrator-comb (CIC) filter circuit configured to output the count value generated by performing cumulative amplification on the period count value received from the period timer.

The touch detection circuit may be further configured to differentiate the count value to generate a difference value; compare the generated difference value with each of a preset falling threshold value and a preset rising threshold value; and output the detection signals having the different levels to identify the human body touch or the non-human body touch based on a result of the comparing.

The touch detection circuit may further include a delay circuit configured to delay the count value by a time that is determined based on a delay control signal, and output a delay count value; a subtraction circuit configured to output a difference value generated by subtracting the count value from the delay count value from the delay circuit; and a slope detection circuit configured to compare the difference value received from the subtraction circuit with each of a preset falling threshold value and a preset rising threshold value, and output the detection signal having a first level or a second level for identifying the touch by the human body or the touch by the non-human body object based on a result of the comparing.

The slope detection circuit may be configured to generate the detection signal having the first level corresponding to the human body touch when the difference value falls and then rises, and generate the detection signal having the second level corresponding to the non-human body touch when the difference value rises and then falls.

The control circuit may be configured to output the control signal including a first control signal for low current control at a time of the human body touch, and output the control signal including a second control signal for high current control at a time of the non-human body touch.

The apparatus may be any one of a Bluetooth headset, a Bluetooth earpiece, smart glasses; a virtual reality (VR) headset, an Augmented Reality (AR) headset, a laptop, a computer, a smart phone, an entrance key of a vehicle, and a stylus touch pen.

In a general aspect, an apparatus includes an input operation unit comprising a detector integrally formed with a housing of the apparatus; a current variable oscillation circuit configured to generate an oscillation signal based on a reactance of a touch to the detector, and a control circuit configured to generate an operational signal based on a detected frequency characteristic of the oscillation signal, and regulate an operating current based on the generated operational signal.

The touch may be detected to be a human body touch based on a change in a capacitance from the touch to the detector, and the touch may be detected to be a non-human touch based on a change in an inductance from the touch to the detector.

The apparatus may further include an input operation detection unit configured to generate a first detection signal of a first frequency level that identifies the human body touch, and generates a second detection signal of a second frequency level that identifies the non-human touch, wherein the first frequency level is different from the second frequency level.

Other features and aspects will be apparent from the following detailed description, the drawings, and the claims

Figure 1A:
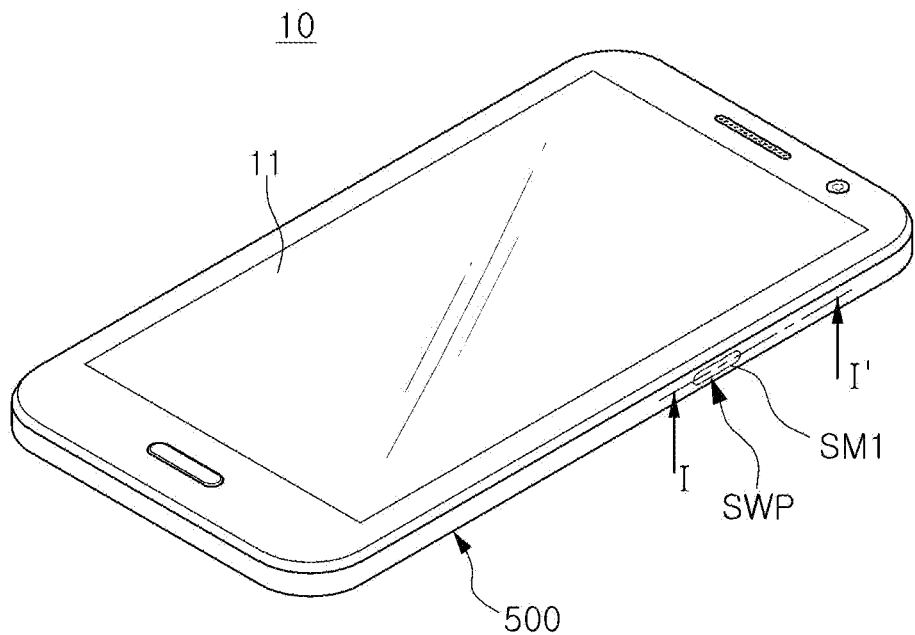
FIGS. 1A and 1B illustrate examples of an appearance of a mobile device, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative size, proportions, and depiction of elements in the drawings may be exaggerated for clarity, illustration, and convenience.

Figure 1B:
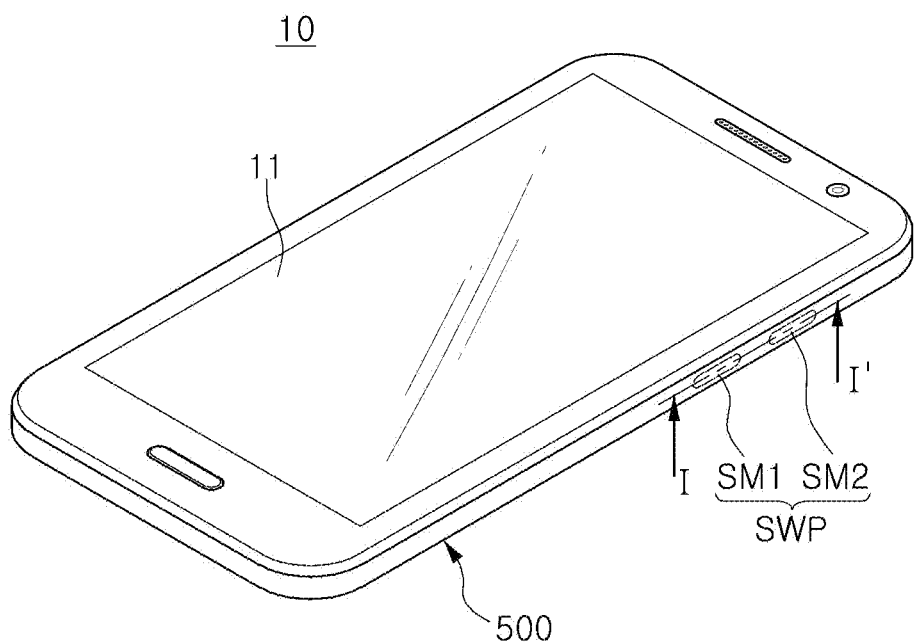

FIGS. 1A and 1B are views illustrating examples of an appearance of a mobile device in accordance with one or more embodiments.

Referring to FIG. 1A, a mobile device 10 to which the examples may be applied may include a touchscreen 11, a housing 500, and an input operation unit SWP including a first switch member SM1, which replaces a mechanical button switch.

Referring to FIG. 1B, a mobile device 10 to which the examples may be applied may include a touchscreen 11, a housing 500, and an input operation unit SWP including first and second switch members SM1 and SM2, which replace a mechanical button switch.

In FIG. 1B, for convenience of explanation, an example in which the input operation unit SWP includes the first and second switch members SM1 and SM2 has been illustrated, but it may be understood that the input operation unit SWP is not limited to only the first and second switch members as described above, and the number of switch members may be increased in a manner similar to the first and second switch members.

As an example, referring to FIGS. 1A and 1B, the mobile device 10 may be a portable device such as a smartphone, personal computer, notebook, or the like or may be a wearable device such as a smartwatch or the like, and is not limited to a specific device, but may be a portable or wearable electrical device or an electrical device having a switch for operation control. The use of the term "may" herein with respect to an example or embodiment, e.g., as to what an example or embodiment may include or implement, means that at least one example or embodiment exists where such a feature is included or implemented while all examples and embodiments are not limited thereto.

The housing 500 may be an external case exposed outward of the electrical device. In an example where a switching operation sensing apparatus is applied to the mobile device, the housing 500 may be a cover disposed on a side or sides of the mobile device 10. As an example, the housing 500 may be formed integrally with a cover disposed on a rear surface of the mobile device 10 or may be formed separately from a cover disposed on a rear surface of the mobile device 10.

As described above, the housing 500 may be an external case of the electrical device, and need not be particularly limited to a specific position, form, or structure.

Referring to FIG. 1B, each of the first and second switch members SM1 and SM2 may be disposed in the housing 500 of the mobile device, but is not limited thereto. The switching operation sensing apparatus may be disposed in the housing of the electrical device.

The first and second switch members SM1 and SM2 may be disposed in the cover of the mobile device. In this example, the cover may be a cover except for the touchscreen, for example, a side cover, a rear cover, or a cover that may be formed on a part of a front surface. An example where the first and second switch members SM1 and SM2 are disposed in the side cover of the mobile device as an example of the housing will be described for convenience of explanation, but the first and second switch members SM1 and SM2 are not limited thereto.

Figure 2:
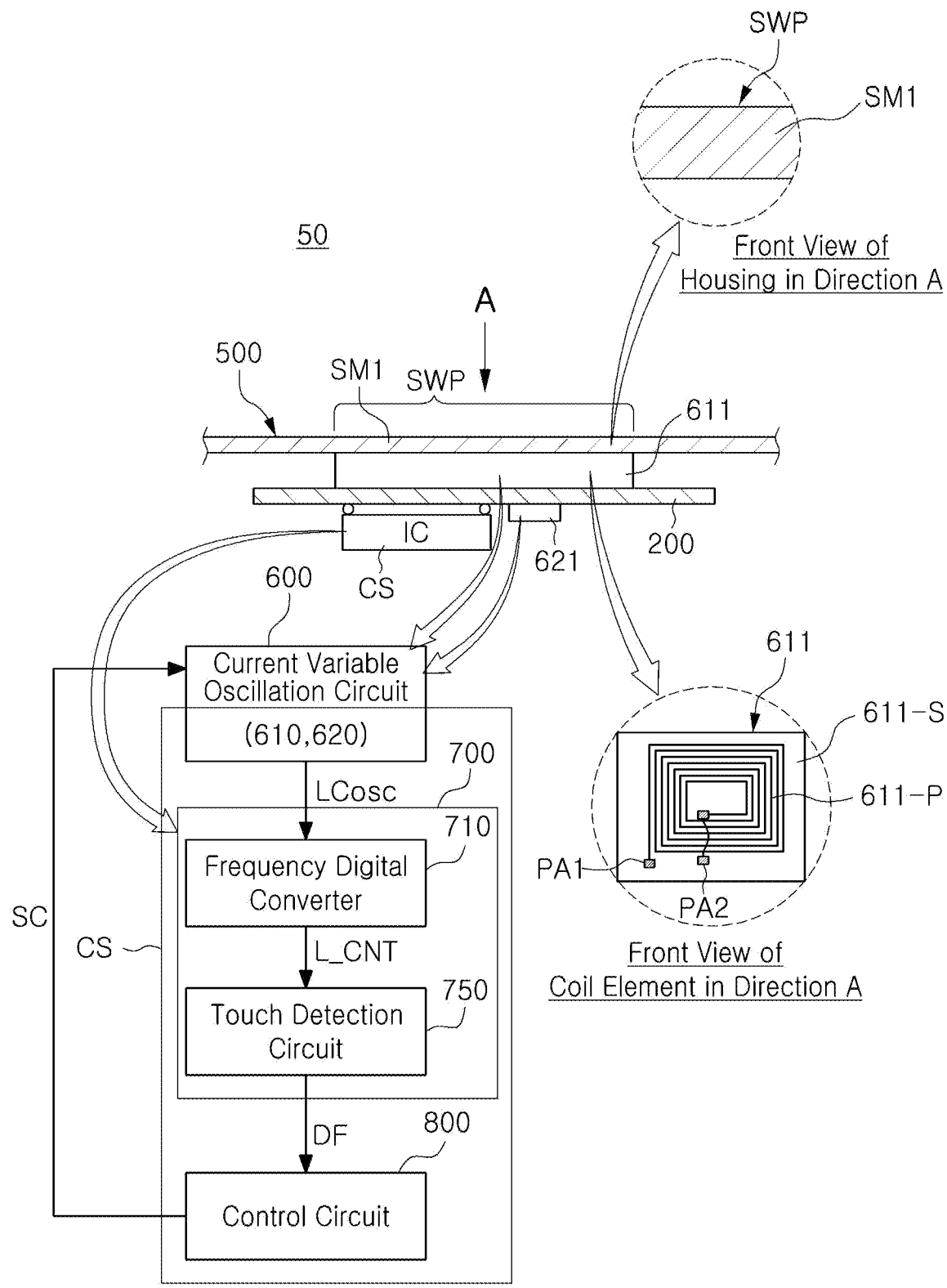
FIG. 2 illustrates an example of a switching operation sensing apparatus including a cross-sectional structure taken along line I-I' of FIG. 1A.

FIG. 2 illustrates an example of a switching operation sensing apparatus including a cross-sectional structure taken along line I-I' of FIG. 1A.

Referring to FIG. 2, a switching operation sensing apparatus according to an example may include an input operation unit SWP, a current variable oscillation circuit 600, an operation detection circuit 700, and a control circuit 800.

The input operation unit SWP may include at least one first switch member SM1 formed integrally with the housing 500 of the electrical device. As an example, the first switch member SM1 may include the same material as that of the housing 500.

The current variable oscillation circuit 600 may generate an oscillation signal LCosc having a frequency that is varied based on a change in a capacitance that occurs on the basis of a detection of a touch by a human body member through the input operation unit SWP, or a change in an inductance that occurs on the basis of a detection of a touch by a non-human body object or member through the input operation unit SWP, and regulate an operating current in response to a control or operational signal SC: DF and DFB.

In an example, the current variable oscillation circuit 600 may include an inductance circuit 610 and a capacitance circuit 620. As an example, a frequency included in the oscillation signal LCosc refers to a resonance frequency (or an oscillation frequency).

As an example, the current variable oscillation circuit 600 may generate a first operating current in an example where a sensing manner is a capacitive sensing manner and generate a second operating current in an example where a sensing manner is an inductive sensing manner, in response to the control signal SC: DF and DFB. As an example, the second operating current may be larger than the first operating current since a large current is required in the inductive sensing manner.

The operation detection circuit 700 may identify and distinguish between a touch that is initiated by a human body and a touch that is initiated by a non-human body object based on characteristics of the resonance frequency included in the oscillation signal LCosc from the current variable oscillation circuit 600, and generate detection signals DF having different levels based on this identification.

As an example, the operation detection circuit 700 may include a frequency digital converter 710 and a touch detection circuit 750.

The frequency digital converter 710 may convert the oscillation signal LCosc received from the current variable oscillation circuit 600 into a count value L_CNT. As an example, the frequency digital converter 710 may generate the count value L_CNT by counting a reference clock signal using the oscillation signal LCosc.

The touch detection circuit 750 may identify the touch by the human body and the touch by the non-human body object based on the count value L_CNT input from the frequency digital converter 710, and output the detection signals DF having different levels based on this identification. Here, at the time of the touch input by the human body, a change in a capacitance may occur, and at the time of the touch input by the non-human body object, a change in an inductance may occur.

Additionally, the control circuit 800 may confirm one sensing manner of capacitive sensing and inductive sensing based on the touch detection signal DF received from the touch detection circuit 750, and generate the control signal SC: DF and DFB that regulates the operating current of the current variable oscillation circuit 600 so as to be suitable for the confirmed sensing manner.

A first example of the input operation unit SWP will be described with reference to a front view of the housing in direction A of FIG. 2.

As an example, the input operation unit SWP may include the first switch member SM1, and in an example, the first switch member SM1 may be formed integrally with the housing 500. Therefore, the first switch member SM1 may be formed of the same material as that of the housing 500. However, this is only an example, and the first switch member SM1 may be formed of a different material as the material of the housing 500.

As an example, when the housing 500 is a conductor such as a metal, the first switch member SM1 may also be a conductor, and when the housing 500 is an insulator such as plastic, the first switch member SM1 may also be an insulator.

Referring to a front view of a first coil element 611 in direction A of FIG. 2, the inductance circuit 610 may include the first coil element 611 disposed inside the first switch member SM1 and having an inductance Lind.

Figure 7:
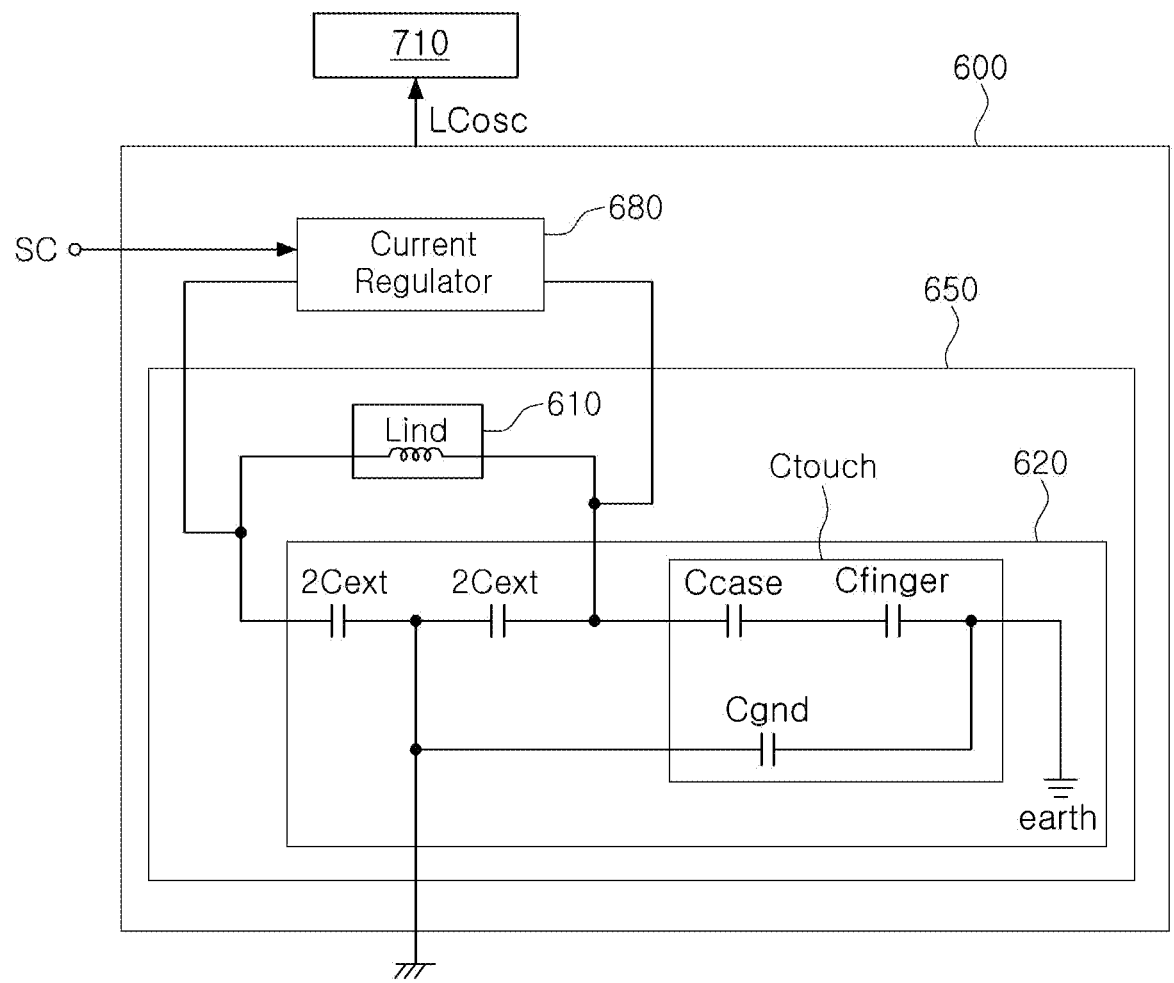
FIG. 7 illustrates an example of a current variable oscillation circuit at the time of the touch by the human body, in accordance with one or more embodiments.

The capacitance circuit 620 may include a capacitor element 621 connected to the inductance circuit 610 and having a capacitance Cext. As an example, the capacitance circuit 620 may include a touch capacitance Ctouch (see FIG. 7) generated at the time of the touch of the input operation unit SWP by the human body. The touch capacitance Ctouch may be generated as illustrated in FIG. 7, and may increase an entire capacitance of the current variable oscillation circuit 600.

As an example, the first coil element 611 may include a coil pattern 611-P connected in a winding type between a first pad PA1 and a second pad PA2 disposed on a printed circuit board (PCB) 611-S. The coil pattern 611-P may be a PCB pattern. The first pad PA1 and the second pad PA2 may be electrically connected to the current variable oscillation circuit 600 through a substrate 200.

The first coil element 611 may be disposed on a first surface (for example, an upper surface) of the substrate 200, and an integrated circuit IC and the capacitor element 621 such as a multilayer ceramic capacitor (MLCC) or the like may be disposed on a second surface (for example, a lower surface) of the substrate 200.

As an example, a circuit unit CS may include a part of the current variable oscillation circuit 600, the frequency digital converter 710, the touch detection circuit 750, and the control circuit 800.

The substrate 200 may include one of a printed circuit board (PCB) and a flexible printed circuit board (FPCB). The substrate 200 is not limited thereto, and may be a board (for example, one of various circuit boards including a PCB) or a panel (for example, a panel for a panel level package (PLP)) in which a circuit pattern may be formed.

A structure of the switching operation sensing apparatus illustrated in FIG. 2 is only an example, and the switching operation sensing apparatus is not limited to having such a structure.

The first switch member SM1 has been described in FIG. 2, but the description for the first switch member SM1 may also be applied to the second switch member SM2 (see FIG. 1B). As an example, in a case where the switching operation sensing apparatus includes the first switch member SM1 and the second switch member SM2, one circuit unit CS may process oscillation signals having different resonance frequencies corresponding, respectively, to the first switch member and the second switch member.

In respective drawings in the present disclosure, an unnecessary overlapping description for components denoted by the same reference numerals and having the same functions will be omitted, and contents different from each other in the respective drawings will be described.

A switching operation sensing apparatus according to each example that is described below may include a plurality of switch members. In the examples, the plurality of switch members may have a structure in which they are arranged in a row or may have a matrix structure in which they are horizontally and vertically arranged.

In an example where the switching operation sensing apparatus includes the first switch member SM1 or the first and second switch members SM1 and SM2 is illustrated in the present disclosure, but this is only an example for convenience of explanation, and the switching operation sensing apparatus is not limited thereto.

Referring to the description for the first and second switch members SM1 and SM2 as described above, it may be understood that the switching operation sensing apparatus includes three or more switch members as well as one switch member and two switch members.

In the examples, a switch member (one of the plurality of switch members) may be formed integrally with the housing 500. Here, the term "integrally" refers to a single structure in which the switch member and the housing are manufactured as one body at the time of being manufactured, the switch member may not be separated from the housing after the switch member and the housing are manufactured, the switch member and the housing are not mechanically separated from each other, and a gap does not exist between the switch member and the housing at all, regardless of whether or not materials of the switch member and the housing are the same as or different from each other.

In the respective drawings in the present disclosure, an unnecessary overlapping description for components denoted by the same reference numerals and having the same functions will be omitted, and contents different from each other in the respective drawings will be described.

Figure 3:
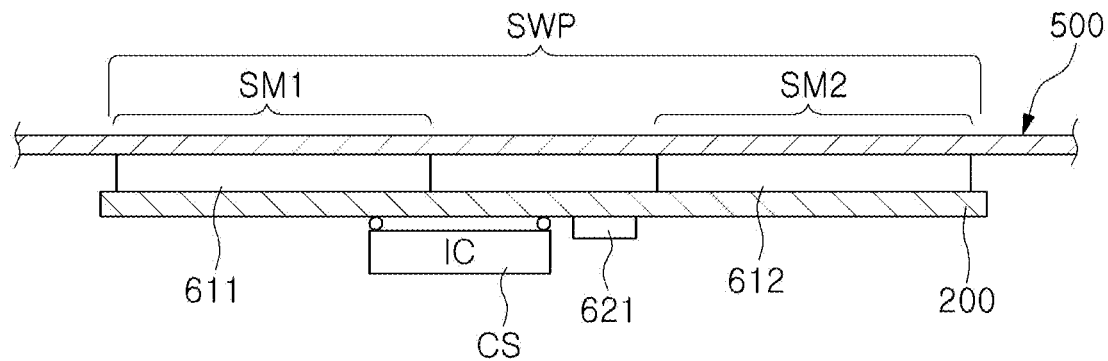
FIG. 3 illustrates another example of a switching operation sensing apparatus including a cross-sectional structure taken along line I-I' of FIG. 1B.

FIG. 3 illustrates another example of a switching operation sensing apparatus including a cross-sectional structure taken along line I-I' of FIG. 1B.

Referring to FIG. 3, a switching operation sensing apparatus according to an example may include an input operation unit SWP including a first switch member SM1 and a second switch member SM2.

Each of the respective first and second switch members SM1 and SM2 may be formed integrally with the housing 500, and may include the same material as that of the housing 500.

Additionally, the inductance circuit 610 (see FIG. 2) of the current variable oscillation circuit 600 (see FIG. 2) may include a first coil element 611 and a second coil element 612, and the capacitance circuit 610 of the current variable oscillation circuit 600 (see FIG. 2) may include a capacitor element 621. The first coil element 611, the second coil element 612, the capacitor element 621, and the circuit unit CS may be mounted on the substrate 200.

The first coil element 611 may be disposed inside the first switch member SM1, and the second coil element 612 may be disposed inside the second switch member SM2.

The switching operation sensing apparatus according to the examples as described above may include a plurality of switch members. In the examples, the switching operation sensing apparatus may include a plurality of coil elements corresponding, respectively, to the plurality of switch members in order to generate oscillation signals having different resonance frequencies based on a touch of each of the plurality of switch members.

As an example, the first switch member SM1 and the second switch member SM2 may be formed of the same material as that of the housing 500. However, this is only an example, and the first switch member SM1 and the second switch member SM2 may be formed of different materials as the material of the housing 500. When the housing 500 is a conductor such as a metal, the first switch member SM1 and the second switch member SM2 may also be conductors, and when the housing 500 is an insulator such as plastic, the first switch member SM1 and the second switch member SM2 may also be insulators.

Additionally, the first coil element 611 and the second coil element 612 may be disposed on a first surface (for example, an upper surface) of the substrate 200, and the circuit unit CS and the capacitor element 621 such as an MLCC or the like may be disposed on a second surface (for example, a lower surface) of the substrate 200. Such a disposition structure is only an example, and a disposition structure of the switching operation sensing apparatus is not limited thereto.

The first and second coil elements 611 and 612 may be disposed on one surface of the substrate 200 so as to be spaced apart from each other, and may be connected to a circuit pattern formed on the substrate 200. For example, each of the first and second coil elements 611 and 612 may be an individual coil element, a chip inductor or the like, such as a solenoid coil, a winding type inductor or the like, but is not limited thereto, and may be an element having an inductance.

casein an example where the conductors constituting the first and second switch members SM1 and SM2 are formed of a metal having high resistance (for example, 100 KO), interference between the first and second switch members SM1 and SM2 may be decreased, such that the switching operation sensing apparatus may be actually applied to the electrical device.

Figure 4:
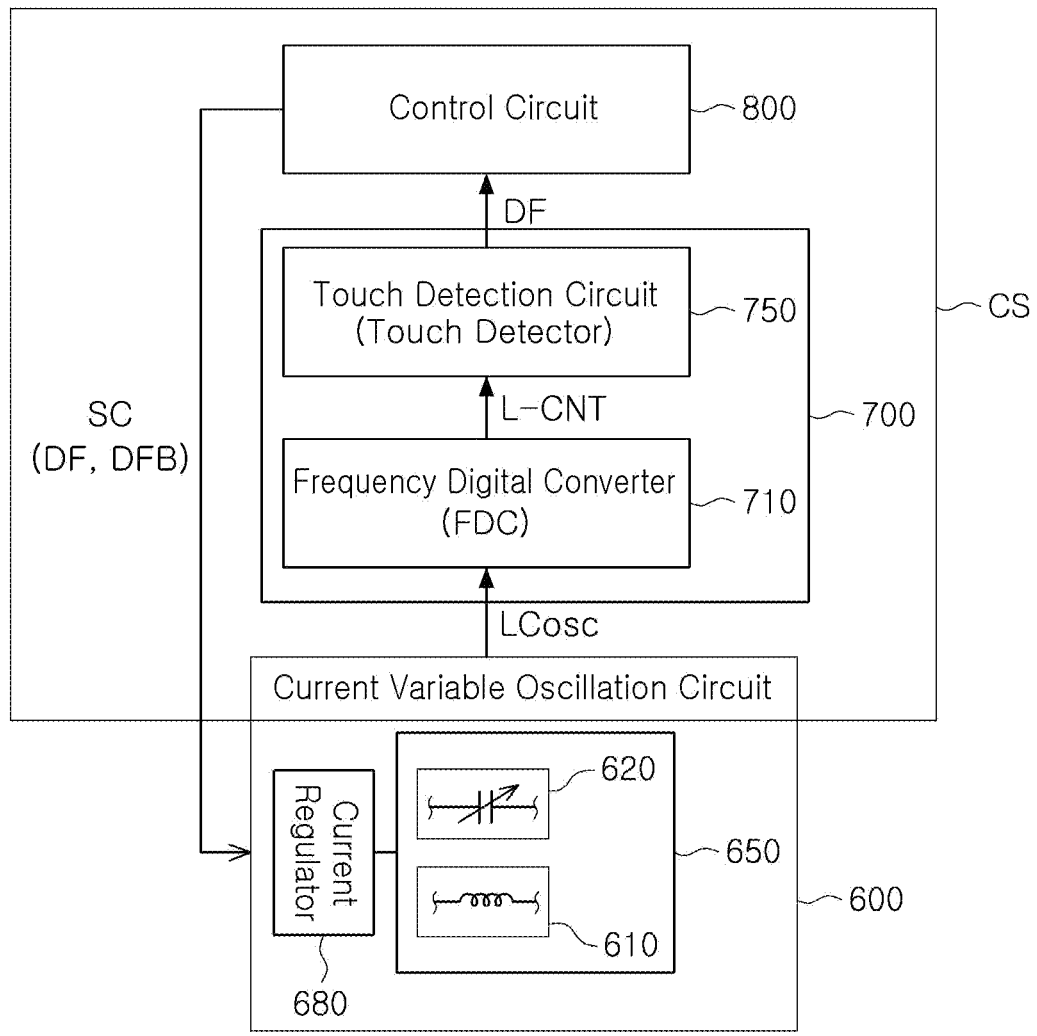
FIG. 4 illustrates an example of a current variable oscillation circuit and a circuit unit of a switching operation sensing, in accordance with one or more embodiments.

FIG. 4 illustrates an example of the current variable oscillation circuit and the circuit unit of the switching operation sensing apparatus according to one or more embodiments.

Referring to FIG. 2 and FIG. 4, a switching operation sensing apparatus according to an example may include a current variable oscillation circuit 600, an operation detection circuit 700, and a control circuit 800.

The current variable oscillator circuit 600 may include a current regulator 680 and an oscillator 650. The current regulator 680 may regulate the operating current in response to the control signal SC. The oscillator 650 may receive the operating current regulated by the current regulator 680, generate an oscillation signal LCosc having a first frequency characteristic when the first switch member SM1 is touched by the human body, and generate an oscillation signal LCosc having a second frequency characteristic when the first switch member SM1 is touched by the non-human body object.

The oscillator 650 may include an LC resonant circuit including an inductance circuit 610 and a capacitance circuit 620.

Referring to FIGS. 2 and 4, the inductance circuit 610 may include a first coil element 611 disposed inside the first switch member SM1, and include an inductance that is varied when a non-human body object touch is input to the first switch member SM1. The capacitance circuit 620 may include a capacitor element 621 connected to the inductance circuit 610, and may include a capacitance varied when a human body touch is input to the first switch member SM1.

Still referring to FIGS. 2 and 4, in an example, the circuit unit CS may include the current regulator 680 and a part of the oscillator 650 of the current variable oscillation circuit 600, a frequency digital converter 710, a touch detection circuit 750, and the control circuit 800. In this example, a part of the oscillator 650 of the current variable oscillation circuit 600 may be a circuit except for some components or elements.

Referring to FIGS. 2 and 4, additionally, the circuit unit CS may or may not include the capacitor element. In an example where the capacitor element 621 is not included in the circuit unit CS, the switching operation sensing apparatus may include a capacitor element 621 such as an MLCC or the like disposed separately from the circuit unit CS. In each example, the circuit unit CS may or may not be an integrated circuit.

The operation detection circuit 700 may identify the touch initiated by the human body and the touch initiated by the non-human body object based on characteristics of the resonance frequency included in the oscillation signal LCosc from the current variable oscillation circuit 600, and generate detection signals DF having different levels based on this identification.

As an example, the operation detection circuit 700 may include a frequency digital converter 710 and a touch detection circuit 750. The frequency digital converter 710 may divide a reference frequency signal fref (see FIG. 15) using a reference frequency dividing ratio N to generate a divided reference clock signal DOSC_ref (see FIG. 15), and output a count value L_CNT generated by counting the divided reference clock signal DOSC_ref (see FIG. 15) using the oscillation signal LCosc.

The touch detection circuit 750 may differentiate the count value L_CNT received from the frequency digital converter 710 to generate a difference value Diff (see FIG. 17), compare the difference value Diff (see FIG. 17) with preset threshold values F_TH and R_TH (see FIG. 17), and output the detection signals DF: Detect Flag having different levels in order to identify a human body touch operation or a non-human body object touch operation based on a comparison result.

In the example, the count value L_CNT may be a digital value generated by a count processing operation by digital signal processing rather than analog signal processing. Therefore, the count value L_CNT may not be generated by signal amplification by a simple analog amplifier, and may be generated according to a count processing operation by the frequency digital converter 710 suggested in the examples. Such a count processing operation may require a reference clock signal (for example, a reference frequency signal) and a sample clock signal (for example, an oscillation signal), which will be described below.

Referring to FIGS. 2 and 4, for example, the current variable oscillation circuit 600 may include the inductance circuit 610 and the capacitance circuit 620, as described above.

Referring to FIGS. 2 and 4, the inductance circuit 610 may include a first coil element 611 disposed inside the first switch member SM1, and the capacitance circuit 620 may include the capacitor element 621 connected to the inductance circuit 621610.

As an example, the current variable oscillation circuit 600 may generate an oscillation signal LCosc having a first frequency characteristic wherein a resonance frequency rises and then falls when the touch initiated by the human body is input to the first switch member SM1, and generate an oscillation signal LCosc having a second frequency characteristic wherein a resonance frequency rises and then falls when the touch initiated by the non-human body object is input to the first switch member SM1.

Still referring to FIGS. 2 and 4, in an example, the inductance circuit 610 may include an inductance that is varied when the touch initiated by the non-human body object is input to the first switch member SM1, and the capacitance circuit 620 may include a capacitance that is varied when the touch initiated by the human body is input to the first switch member SM1.

As an example, the first coil element 611 may be mounted on the substrate 200, and may be attached to an inner side surface of the first switch member SM1.

Figure 5:
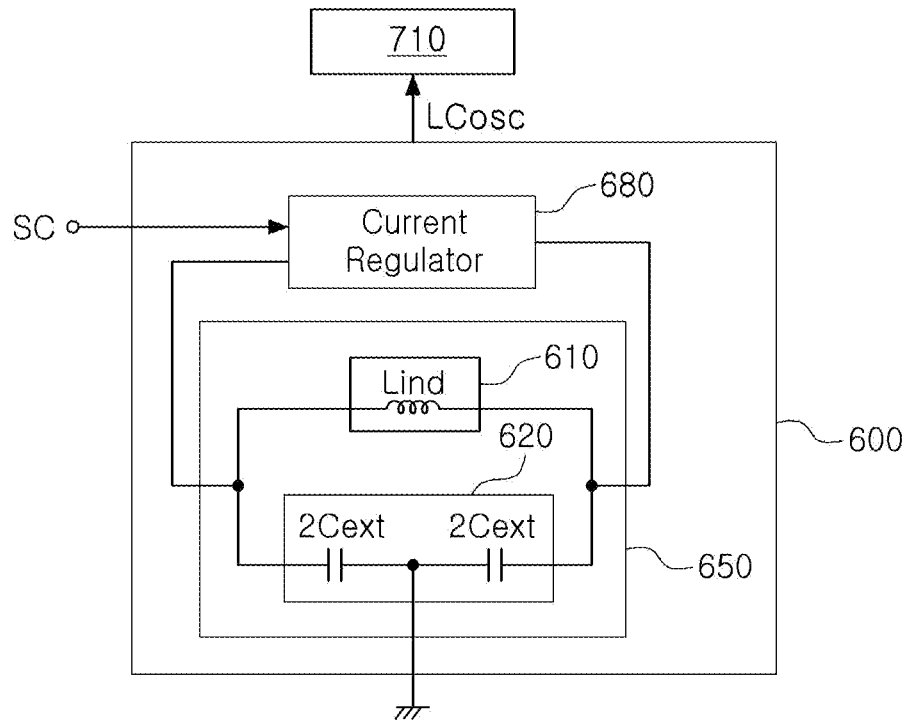
FIG. 5 illustrates an example of a current variable oscillation circuit in an example where there is no touch, in accordance with one or more embodiments.

FIG. 5 illustrates an example of a current variable oscillation circuit in a case where there is no touch input, in accordance with one or more embodiments.

Referring to FIG. 5, the current variable oscillation circuit 600 may include the current regulator 680 and the oscillator 650, as described above, and the oscillator 650 may include the inductance circuit 610 and the capacitance circuit 620.

The inductance circuit 610 may include an inductance Lind of the first coil element 611 in an example where a touch input by a non-human body object is not detected. The capacitance circuit 620 may include a capacitance Cext: 2Cext and 2Cext of the capacitor element 621 such as MLCC in an example where a touch input by the human body is not detected.

As described above, the oscillator 650 may include a parallel resonant circuit including the inductance circuit 610 having the inductance (Lind) of the first coil element 611 and the capacitance circuit 620 having the capacitance Cext: 2Cext and 2Cext of the capacitor element 621.

casein an example where a touch by the human body of the non-human body object is not detected, a first resonance frequency fres1 of the current variable oscillation circuit 600 may be represented by Equation 1 below:

$$\text{fres1} \approx 1/2\pi\text{sqrt}(Lind*Cext). \qquad \text{Equation 1:}$$

In Equation 1, ≈ refers to "equal" or "similar". Here, "similar" means that other values may further be included.

In the examples, a capacitive sensing manner may be applied when the touch by the human body is input and an inductive sensing manner may be applied when the touch by the non-human body object is input, according to an object touching a touch surface of the first switch member SM1 formed integrally with the housing 500 of the mobile device. Therefore, the human body and the non-human body object among objects may be distinguished from each other. For example, the human body may be a person's hand, and the non-human body object may be a conductor such as a metal or the like that is not a part of the human body.

Figure 6:
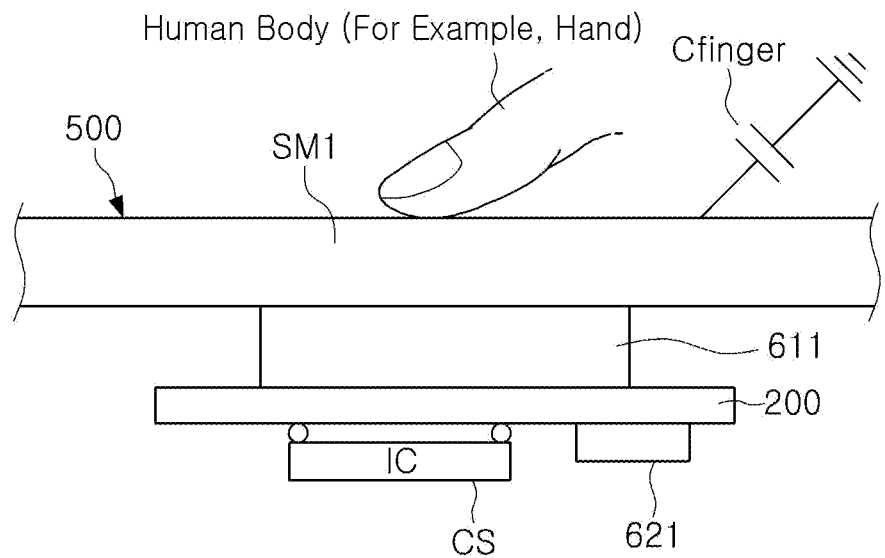
FIG. 6 illustrates an example of a capacitive sensing manner by a touch by a human body, in accordance with one or more embodiments.

FIG. 6 illustrates a capacitive sensing manner by a touch by a human body, in accordance with one or more embodiments.

Referring to FIG. 6, in an example where there is a touch by the human body, the capacitance circuit 620 of the current variable oscillation circuit 600 may further include a touch capacitance Ctouch that is formed by the touch by the human body. Therefore, an entire capacitance may be varied.

In an example where the human body (for example, a hand) touches the touch surface of the switch member SM1, a capacitive sensing principle may be applied, such that the entire capacitance is increased. Therefore, the first resonance frequency fres1 (Equation 1) of the current variable oscillation circuit 600 may be decreased.

FIG. 7 illustrates an example of a current variable oscillation circuit at the time of a touch by the human body, in accordance with one or more embodiments.

FIG. 7 illustrates an example of the capacitance circuit.

Referring to FIG. 7, a current variable oscillation circuit 600 may include a touch capacitance Ctouch: Case, Cfinger, and Cgnd formed at the time a touch by the human body is input, as well as the capacitances Cext: 2Cext and 2Cext of the capacitor element 621 included in the capacitance circuit 620.

Referring to FIG. 7, the touch capacitance Ctouch: Ccase, Cfinger, and Cgnd may be a case capacitance Ccase and a finger capacitance Cfinger connected to each other in series and a ground capacitance Cgnd between a circuit ground and an earth.

Therefore, it may be seen that an entire capacitance of the current variable oscillation circuit 600 of FIG. 7 may be varied as compared with the current variable oscillation circuit 600 of FIG. 5.

In an example where the capacitance 2Cext and 2Cext is expressed by an equivalent circuit in which the capacitance 2Cext and 2Cext is divided into one capacitance 2Cext and the other capacitance 2Cext on the basis of the circuit ground, the case capacitance Ccase, the finger capacitance Cfinger, and the ground capacitance Cgnd may be connected to one capacitance 2Cext or the other capacitance 2Cext in parallel.

In an example where there is a touch input, a second resonance frequency fres2 of the current variable oscillation circuit 600 may be represented by Equation 2 below:

$$\text{fres2} \approx 1/\{2\pi\text{sqrt}(Lind*[2Cext\|(2Cext+CT)])\}$$

$$CT \approx C\text{case}\|C\text{finger}\|C\text{gnd}. \qquad \text{Equation 2:}$$

In Equation 2, ≈ refers to "equal" or "similar". Here, "similar" means that other values may further be included. In Equation 2, Ccase is a parasitic capacitance existing between the case (cover) and the first coil element 611, Cfinger is a capacitance of the human body, and Cgnd is a ground return capacitance between the circuit ground and the earth.

Additionally, in Equation 2, II is defined as follows: 'a∥b' is a series connection of 'a' and 'b' in a circuit, and a sum thereof is calculated as '(a*b)/(a+b)'.

When comparing Equation 1 (an example where there is no touch input) and Equation 2 (an example where there is a touch input by the human body) with each other, it may be seen that a capacitance 2Cext of Equation 1 is increased to a capacitance (2Cext+CT) of Equation 2, and the first resonance frequency fres1 in which there is no touch input by the human body is thus decreased to the second resonance frequency fres2 in which there is a touch by the human body.

Again referring to FIG. 7, the current variable oscillation circuit 600 may generate an oscillation signal having the first resonance frequency fres1 in an example where there is no touch input by the human body or an oscillation signal having the second resonance frequency fres2 in an example where there is a touch input by the human body, and output the generated oscillation signal to the frequency digital converter 710.

Figure 8:
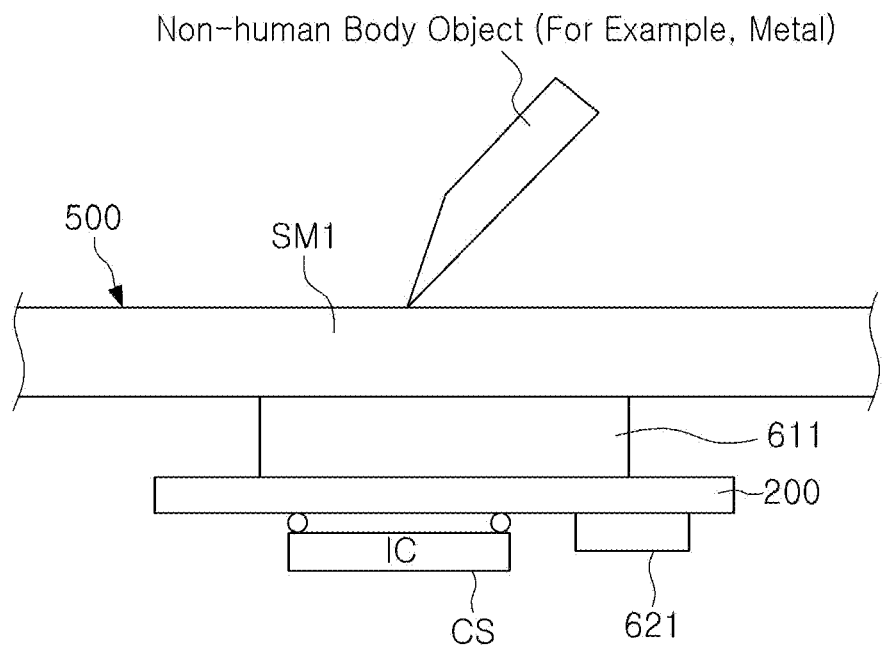
FIG. 8 illustrates an example of an inductive sensing manner by a touch by a non-human body object, in accordance with one or more embodiments.
Figure 9:
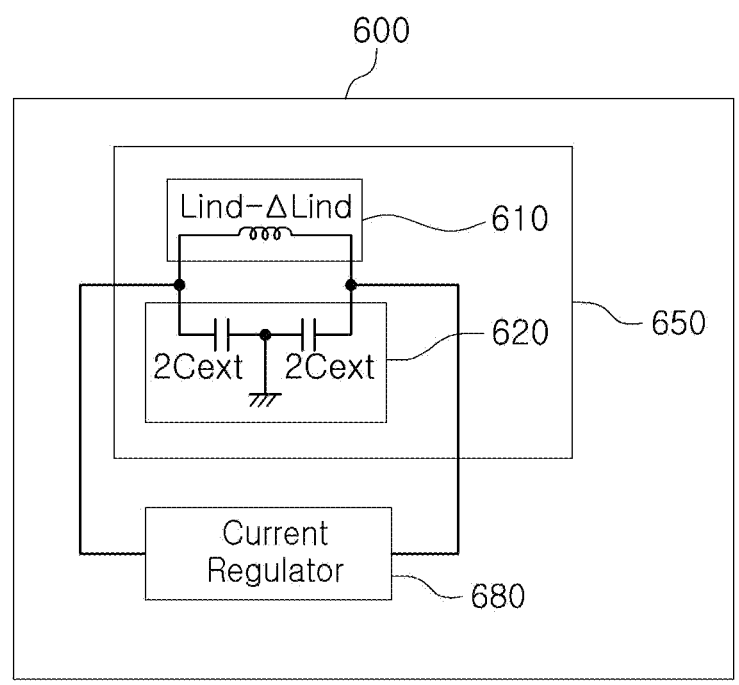
FIG. 9 illustrates an example of a current variable oscillation circuit at the time of the touch by the non-human body object, in accordance with one or more embodiments.

In contrast, referring to FIGS. 8 and 9, in an example where a non-human body object such as a conductor (metal) touches the touch surface of the first switch member SM1, an inductive sensing principle may be applied, such that an inductance is decreased due to an eddy current, resulting in an increase in a resonance frequency.

As described above, in an example of using a switching operation sensing structure in which the two sensing manners are mixed with each other, the touch by the human body and the touch by the non-human body object may be distinguished from each other according to a change direction (whether the resonance frequency falls and then rises or rises and then falls) of the resonance frequency of the oscillation signal.

FIG. 8 illustrates an inductive sensing manner by a touch input by a non-human body object, and FIG. 9 illustrates an example of a current variable oscillation circuit at the time of the touch by the non-human body object.

Referring to FIGS. 8 and 9, in an example where the non-human body object such as the conductor (metal) touches the touch surface of the first switch member SM1, the inductive sensing principle may be applied, such that the inductance is decreased due to the eddy current, resulting in an increase in the resonance frequency.

In the examples, when a touch by a non-human body object such as, for example, a metal, is input to the touch surface of the first switch member SM1 of the housing 500 of the mobile device, the inductive sensing manner may be applied. Therefore, the touch input by the non-human body object may be detected.

Referring to FIG. 9, when the touch by a non-human body object such as a metal is input to the first switch member SM1, an inductance may be decreased (Lind−ΔLind) due to a change in a magnetic force between the first switch member SM1 and the first coil element 611, such that a resonance frequency is increased. Therefore, the touch input by the non-human body object may be detected.

The inductive sensing principle illustrated in FIGS. 8 and 9 will be described below.

First, when an oscillation circuit is operated, an alternating current (AC) current may be generated in an inductance, resulting in a magnetic field (H-field). In this example, when a metal touches a switch member, the magnetic field (H-field) of the inductor may have an influence on the metal to generate a circulating current, that is, an eddy current. Then, a magnetic field in a reverse direction may be generated due to the eddy current, which causes the magnetic field (H-field) of the inductor to be decreased. Therefore, an existing inductance of the inductor may be decreased, resulting in an increase in the resonance frequency.

More specifically, a determination may be made whether C (capacitance) of the resonance frequency is changed, or whether L (inductance) of the resonance frequency is changed depending on whether a human body (for example, a hand) touches the switch member of the housing, or whether a conductor (metal) touches the switch member of the housing, and a determination may be made whether the frequency is increased or decreased based on whether C (capacitance) of the resonance frequency is changed, or L (inductance) of the resonance frequency is changed. Another big difference between two systems may be current consumption.

For example, current consumption of the inductive sensing should be much larger than the current consumption of capacitive sensing. In the capacitive sensing, a characteristic change proportional to a distance may be substantially neglected, but for the purpose of the inductive sensing, a sufficient amount of eddy current should be generated as described above, which is inversely proportional to a distance.

As described above, the switching operation sensing apparatus that implements a single switch member may be used to enable capacitive sensing and inductive sensing, detect a touch by a human body and a touch by a non-human body object, and distinguish and recognize the differences between the touch by the human body and the touch by the non-human body object. An operation of distinguishing and recognizing the touch by the human body and the touch by the non-human body object from each other will be described below.

Figure 10:
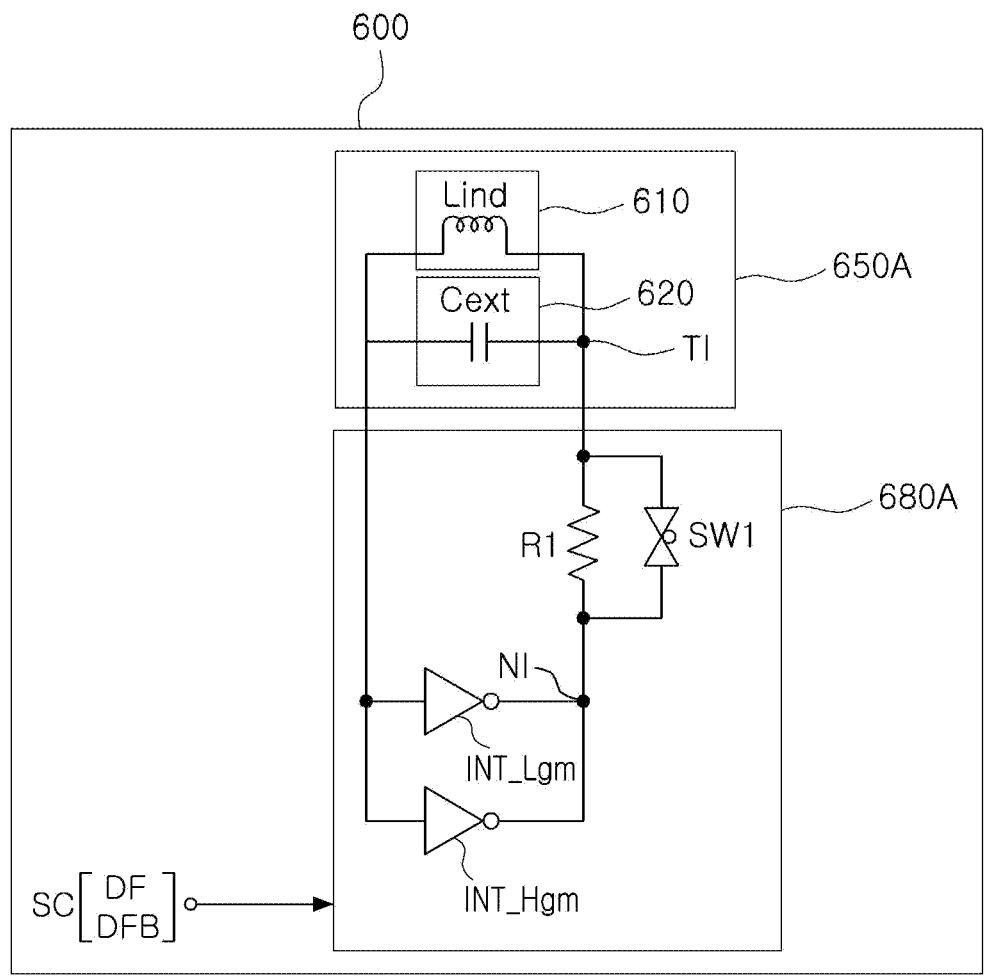
FIG. 10 is a circuit diagram illustrating an example of a current variable oscillation circuit, in accordance with one or more embodiments.

FIG. 10 is a circuit diagram illustrates an example of a current variable oscillation circuit, in accordance with one or more embodiments.

Referring to FIG. 10, a current variable oscillator circuit 600 may include a current regulator 680A and an oscillator 650A.

The current regulator 680A may include a first inverter circuit INT_Lgm, a second inverter circuit INT_Hgm, a first resistor R1, and a first switch SW1.

The first inverter circuit INT_Lgm may be connected to the oscillator 650, may have a first gm-cell Lgm, and may be enabled (or may be turned on) in a capacitive sensing manner a touch by a human body is input, in response to a control signal SC: DF and DFB.

The second inverter circuit INT_Hgm may be connected in parallel with the first inverter circuit INT_Lgm, may have a second gm-cell Hgm, and may be enabled (or may be turned on) in an inductive sensing manner at the time of the touch by the non-human body object in response to a control signal SC: DF and DFB.

The first resistor R1 may be connected between a connection node N1 between the first inverter circuit INT_Lgm and the second inverter circuit INT_Hgm and one end T1 of the oscillator 650.

The first switch SW1 may be connected in parallel with the first resistor R1, and may be turned off in the capacitive sensing manner when a touch by the human body is sensed, and may be turned on in the inductive sensing manner when a touch by the non-human body object is sensed.

When the current variable oscillation circuit 600 of FIG. 10 is implemented, the current regulator 680A of the current variable oscillation circuit 600 may regulate an operating current by selecting one of the first gm-cell Lgm, which is small, and the second gm-cell Hgm, which is large, according to a sensing manner in a system in which capacitive sensing and inductive sensing are combined with each other, and may thus decrease current consumption. For example, the first inverter circuit INT_Lgm and the second inverter circuit INT_Hgm maintain resonance in the current variable oscillation circuit to allow an oscillation signal to be generated.

In an example, where the first switch member (for example, a glass case) of the housing is touched by a human body (for example, the hand), the resonance frequency has the first frequency characteristic (a characteristic that the resonance frequency falls and then rises), and it is thus recognized that a sensing manner is the capacitive sensing based on the first frequency characteristic, such that a detection signal Detect Flag having a first level (for example, a high level) may be output. Alternatively, in an example where the first switch member is touched by a non-human body object (for example, a metal), the resonance frequency has the second frequency characteristic (a characteristic that the resonance frequency rises and then falls), and it is thus recognized that a sensing manner is the inductive sensing based on the second frequency characteristic, such that a detection signal Detect Flag having a second level (for example, a low level) may be output.

As described above, the current variable oscillation circuit 600 may select and operate a different gm-cell Lgm or Hgm as an example according to whether the detection signal Detect Flag has the first level (for example, the high level), or has the second level (for example, the low level), and thus decrease current consumption.

In an example where the detection signal Detect Flag has the first level (for example, the high level), the control circuit 800 (see FIG. 2) may output a control signal SC: DF and DFB including a DF signal having a first level (for example, a high level) and a DFB signal having a second level (for example, a low level). On the contrary, in an example where the detection signal Detect Flag has the second level (for example, the low level), the control circuit 800 (see FIG. 2) may output a control signal SC: DF and DFB including a DF signal having a second level (for example, a low level) and a DFB signal having a first level (for example, a high level).

In an example where the control signal SC includes the DF signal having the first level (for example, the high level) and the DFB signal having the second level (for example, the low level), the sensing manner is the capacitive sensing. Therefore, the current variable oscillation circuit 600 may select the first inverter circuit INT_Lgm having the first gm-cell Lgm that is small, and turn off the first switch SW1, such that the first resistor R1 (for example, kohm to Mohm) connected in parallel with the first switch SW1 is shown, and an operating current is thus decreased.

In an example where the control signal SC includes the DF signal having the second level (for example, the low level) and the DFB signal having the first level (for example, the high level), the sensing manner is the inductive sensing. Therefore, the current variable oscillation circuit 600 may select the second inverter circuit INT_Hgm having the second gm-cell Lgm that is large, and turn on the first switch SW1, such that the first resistor R1 (for example, kohm to Mohm) connected in parallel with the first switch SW1 is not shown, and an operating current is relatively increased.

Specifically, the current variable oscillation circuit 600 may select and operate the gm-cell as described above based on the control signals SC: DF and DFB. For example, the current variable oscillation circuit 600 may select the second gm cell Hgm that is large when the sensing manner is an inductive sensing, and select the first gm-cell Lgm that is small when the sensing manner is a capacitive sensing. Although the first switch SW1 is not present, there may not be operational issues. However, when the first switch SW1 is used, performance may be improved.

Figure 11:
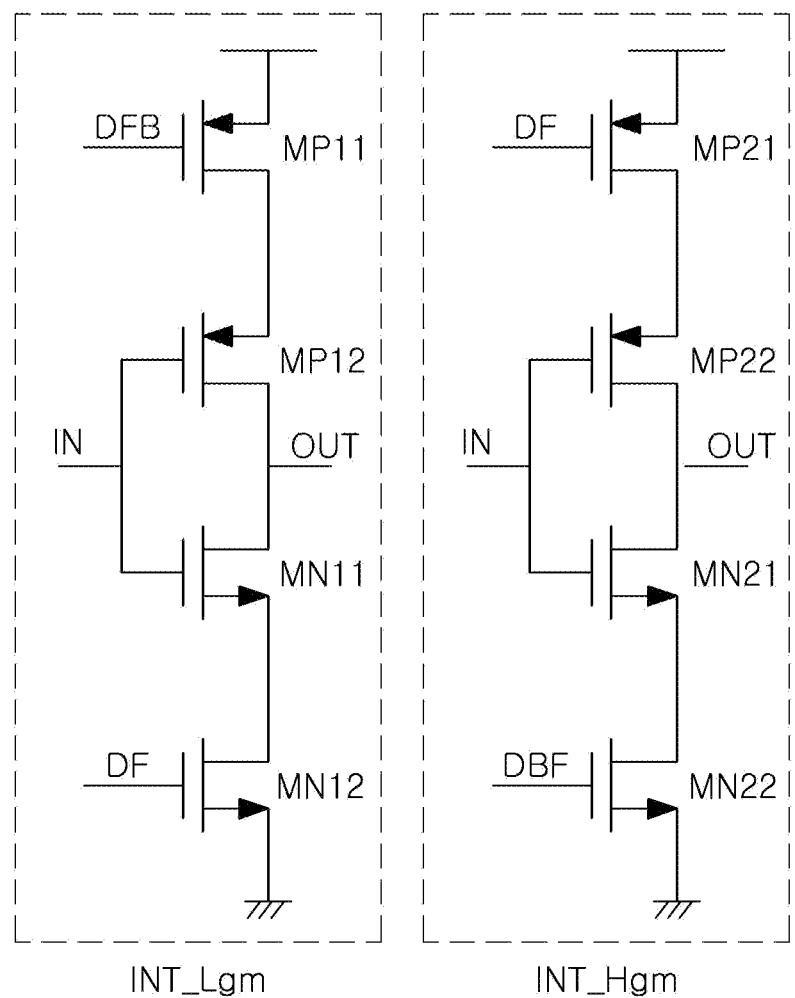
FIG. 11 is a partially detailed circuit diagram of the current variable oscillator circuit of FIG. 10.

FIG. 11 illustrates a partially detailed circuit diagram of the current variable oscillator circuit of FIG. 10.

Referring to FIGS. 10 and 11, the first inverter circuit INT_Lgm may include four transistors MP11, MP12, MN11, and MN12 stacked between a power supply terminal and a ground terminal. In an example, the transistors MP11 and MN12 connected to the power supply terminal and the ground terminal, respectively, among the four transistors MP11, MP12, MN11, and MN12 may be operation switch elements that perform switching operations in response to the control signals DF and DFB, and two intermediate transistors MP12 and MN11 among the four transistors MP11, MP12, MN11, and MN12 may be inverter switch elements that perform complementary switching operations.

The operation switch elements MP11 and MN12 of the first inverter circuit INT_Lgm may be turned on in the capacitive sensing mode, and may be turned off in the inductive sensing mode, based on the control signals DF and DFB.

The second inverter circuit INT_Hgm may also include four transistors MP21, MP22, MN21, and MN22 stacked between a power supply terminal and a ground terminal, similar to the first inverter circuit INT_Lgm. In an example, the transistors MP21 and MN22 connected to the power supply terminal and the ground terminal, respectively, among the four transistors MP21, MP22, MN21, and MN22 may be operation switch elements that perform switching operations in response to the control signals DF and DFB, and two intermediate transistors MP22 and MN21 among the four transistors MP21, MP22, MN21, and MN22 may be inverter switch elements that perform complementary switching operations.

The operation switch elements MP21 and MN22 of the second inverter circuit INT_Hgm may be turned off in the capacitive sensing mode and may be turned on in the inductive sensing mode, based on the control signals DF and DFB.

More specifically, in an example where the DF signal of the control signals has the first level (for example, the high level), the sensing manner may be the capacitive sensing manner. In this example, since the DF signal has the first level (for example, the high level) and the DFB signal has the second level (for example, the low level), the first inverter circuit INT_Lgm may be operated and the second inverter circuit INT_Hgm may be turned off to supply a first operating current.

In contrast, in an example where the DF signal of the control signals has the second level (for example, the low level), the sensing manner may be the inductive sensing manner. In this example, since the DF signal has the second level (for example, the low level) and the DFB signal has the first level (for example, the high level), the second inverter circuit INT_Hgm may be operated and the first inverter circuit INT_Lgm may be turned off to supply a second operating current larger than the first operating current.

Figure 12:
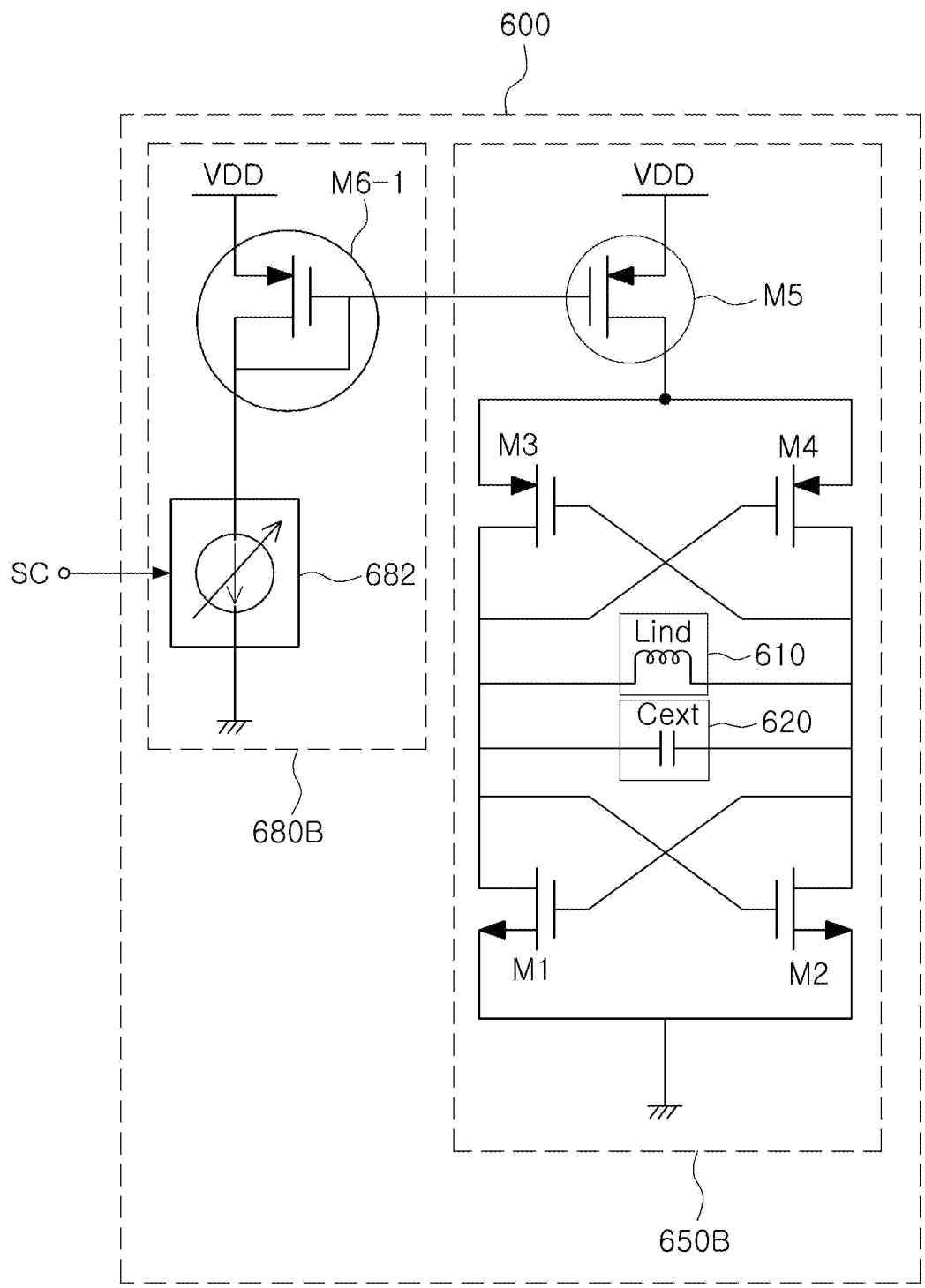
FIG. 12 is a circuit diagram illustrating a second exemplary embodiment of a current variable oscillation circuit.

FIG. 12 is a circuit diagram illustrating an example of a current variable oscillation circuit.

Referring to FIG. 12, a current variable oscillator circuit 600 may include a current regulator 680B and an oscillator 650B.

The current regulator 680B may include a mirror transistor M6-1 and a current source 682 connected between the terminal of a power supply voltage Vdd and a ground.

The mirror transistor M6-1 may be connected between the terminal of the power supply voltage Vdd and the ground to form a current mirror with the oscillator 650B.

The current source 682 may be connected between the terminal of the power supply voltage Vdd and the mirror transistor M6-1 or between the mirror transistor M6-1 and the ground, and may generate a current varied, based on a control signal SC.

The oscillator 650B may include a first cross-coupled transistor pair M1 and M2, a second cross-coupled transistor pair M3 and M4, and a current regulation transistor M5.

The first cross-coupled transistor pair M1 and M2 and the second cross-coupled transistor pair M3 and M4 may be connected in parallel with an inductance circuit 610 or a capacitance circuit 620, and may generate an oscillation signal LCosc having a resonance frequency by the inductance circuit 610 and the capacitance circuit 620.

The current regulation transistor M5 may form a current mirror with the current regulator 680B to generate an operating current regulated by the current regulator 680B and supply the generated operating current to the first cross-coupled transistor pair M1 and M2 and the second cross-coupled transistor pair M3 and M4.

As an example, the current source 682 may be regulated to regulate a current supplied to an oscillation circuit including the first cross-coupled transistor pair M1 and M2 and the second cross-coupled transistor pair M3 and M4 through the current regulation transistor M5.

In an example where the current source 682 is a current source that may regulate a current according to the sensing manner, when the sensing manner is the inductive sensing manner, a high current mode may be selected to allow a relatively large current to flow from the current source 682, and when the sensing manner is the capacitive sensing manner, a low current mode may be selected to allow a relatively small current to flow from the current source 682.

Figure 13:
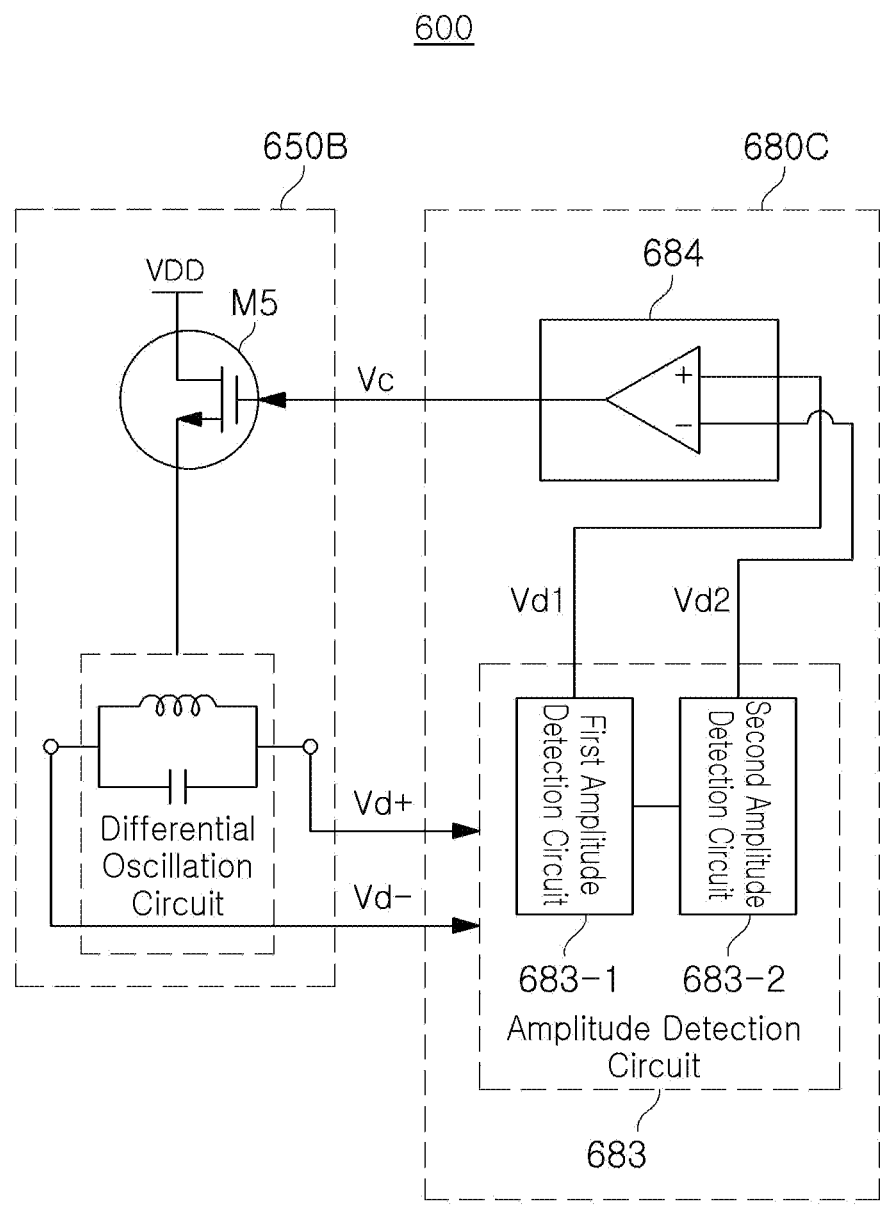
FIG. 13 is a circuit diagram illustrating another example of a current variable oscillation circuit, in accordance with one or more embodiments.

FIG. 13 is a circuit diagram illustrating another example of a current variable oscillation circuit, in accordance with one or more embodiments.

Referring to FIG. 13, a current variable oscillator circuit 600 may include a current regulator 680C and an oscillator 650C.

The current regulator 680C may include an amplitude detection circuit 683 and an error amplifier circuit 684.

The amplitude detection circuit 683 may include a first amplitude detection circuit 683-1 and a second amplitude detection circuit 683-2.

The first amplitude detection circuit 683-1 may detect an amplitude of a positive signal Vd+ of differential signals of the oscillator 650 and output a first detected voltage Vd1 from a common source of the first and second N-channel field effect transistors (FETs) MN1 and MN2.

The second amplitude detection circuit 683-2 may detect an amplitude of a negative signal Vd– of the differential signals of the oscillator 650 and output a second detected voltage Vd2 from a common source of the first and second P-channel FETs MP1 and MP2.

The oscillator 650B may generate the differential signals Vd+ and Vd– having the positive signal Vd+ and the negative signal Vd– whose phases are opposite to each other. For example, the oscillator 650B may be a circuit that may generate the differential signals Vd+ and Vd– having the positive signal Vd+ and the negative signal Vd– whose phases are opposite to each other. As an example, the oscillator 650B may include a differential oscillator circuit or a differential amplifier circuit, but is not limited thereto.

As an example, the oscillator 650B may perform an oscillation operation using the current regulated by the current regulation transistor M5 to generate the differential signals Vd+ and Vd– having the positive signal Vd+ and the negative signal Vd– whose phases are opposite to each other.

The amplitude detection circuit 683 may detect amplitudes of the differential signals Vd+ and Vd– and output the first and second detected voltages Vd1 and Vd2.

The error amplifier circuit 684 may control the oscillator 650B based on an error voltage between the first and second detected voltages Vd1 and Vd2. As an example, the error amplifier circuit 684 may be implemented by an operational amplifier having a non-inverting input terminal receiving the first detected voltage Vd1, an inverting input terminal receiving the second detected voltage Vd2, and an output terminal outputting a difference voltage Vd (V1–V2) between the first detected voltage Vd1 and the second detected voltage Vd2.

Figure 14:
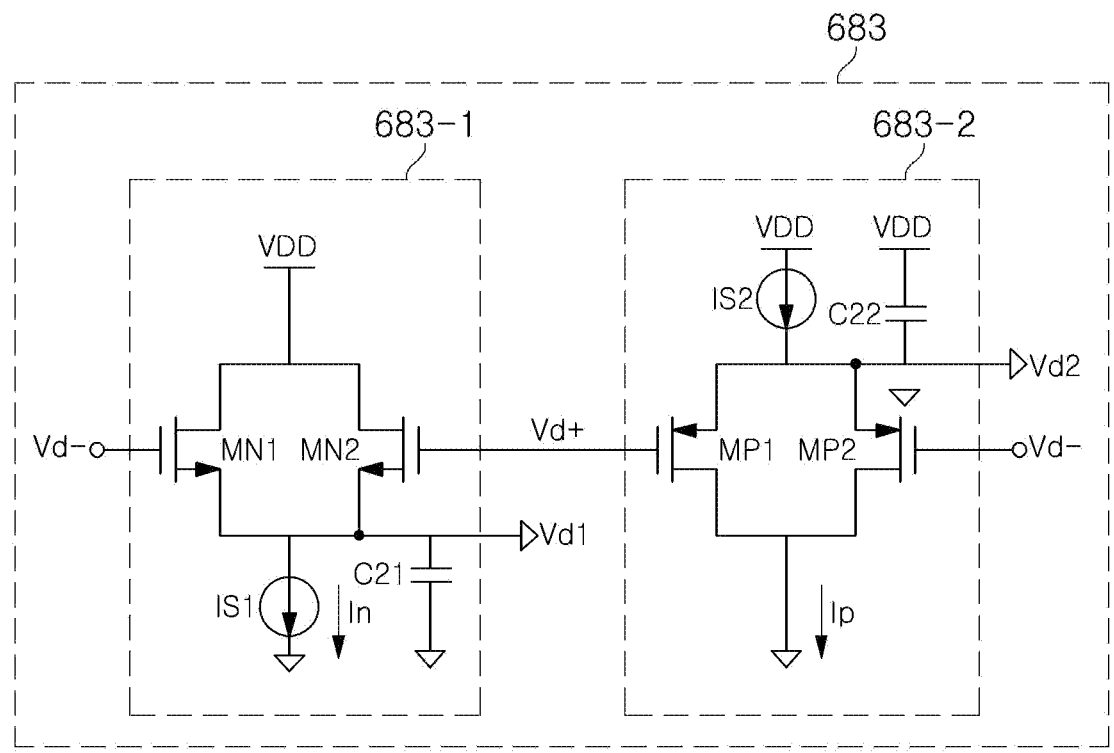
FIG. 14 illustrates an example of an amplitude detection circuit of FIG. 13.

FIG. 14 illustrates an example of the amplitude detection circuit of FIG. 13.

Referring to FIGS. 13 and 14, the amplitude detection circuit 683 may include the first amplitude detection circuit 683-1 and the second amplitude detection circuit 683-2.

The first amplitude detection circuit 683-1 may include first and second N-channel FETs MN1 and MN2 and a first current source IS1. The first and second N-channel FETs MN1 and MN2 may have drains commonly connected to the terminal of the power supply voltage VDD, gates receiving the positive signal Vd+ and the negative signal Vd–, respectively, and sources commonly connected to each other.

The first current source IS1 may be connected between the common source of the first and second N-channel FETs MN1 and MN2 and a ground, and may provide a current In.

The first amplitude detection circuit 683-1 may detect the amplitude of the positive signal Vd+ and output the first detected voltage Vd1 as represented by Equation 3 below from the common source of the first and second N-channel FETs MN1 and MN2:

$$Vd1 = Vmax - Vgsn.\qquad\text{Equation 3:}$$

In Equation 3, Vmax is a peak value of the positive signal Vd+, and Vgsn is a gate-source voltage of the first N-channel FET MN1.

Additionally, in FIG. 14, C21 is a capacitor, which may stabilize the first detected voltage Vd1 by bypassing noise such as an AC component or similar component to the ground.

The second amplitude detection circuit 683-2 may include a second current source IS2, and first and second P-channel FETs MP1 and MP2.

The second current source IS2 may be configured to have a first end connected to the terminal of the power supply voltage VDD and a second end connected to a common source of the first and second P-channel FETs MP1 and MP2.

The first and second P-channel FETs MP1 and MP2 may have sources commonly connected in parallel with the second end of the second current source IS2, gates receiving the positive signal Vd+ and the negative signal Vd–, respectively, and drains commonly connected to the ground.

The second current source IS2 may be connected between the terminal of the power supply voltage VDD and the common source of the first and second P-channel FETs MP1 and MP2, and may provide a current Ip.

The second amplitude detection circuit 683-2 may detect the amplitude of the negative signal Vd– and output the second detected voltage Vd2 as represented by Equation 4 below from the common source of the first and second P-channel FETs MP1 and MP2:

$$Vd2 = Vmin - Vgsp.\qquad\text{Equation 4:}$$

In Equation 4, Vmin is a peak value of the negative signal Vd–, and Vgsp is a gate-source voltage of the first P-channel FET MP1.

Additionally, in FIG. 14, C22 is a capacitor, which may stabilize the second detected voltage Vd2 by bypassing noise such as an AC component or the like to the ground.

Figure 15:
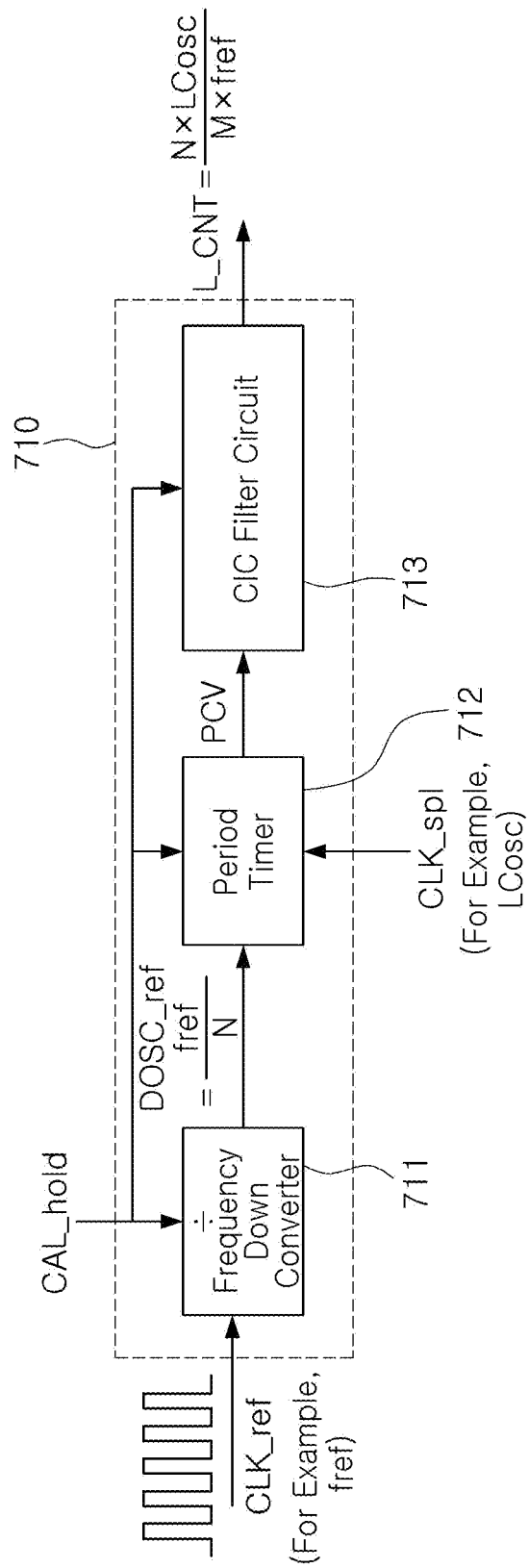
FIG. 15 illustrates an example of a frequency digital converter.

FIG. 15 illustrates an example of a frequency digital converter.

Referring to FIG. 15, as an example, the frequency digital converter 710 may divide a reference frequency signal fref using a reference frequency dividing ratio N to generate a divided reference clock signal DOSC_ref=fref/N, and output a count value L_CNT generated by counting the divided reference clock signal DOSC_ref using the oscillation signal LCosc.

As an example, as represented by Equation 5 below, the frequency digital converter 710 may divide the reference frequency signal fref using the reference frequency dividing ratio N to generate the divided reference clock signal DOSC_ref=fref/N, divide the oscillation signal LCosc from the current variable oscillation circuit 600 using a sensing frequency dividing ratio M, and output the count value L_CNT generated by counting the divided reference clock signal DOSC_ref using the divided oscillation signal LCosc/M.

Alternatively, the frequency digital converter 710 may count the divided reference signal using the divided sensing signal.

$$L\_CNT = (N*LCosc)/(M*fref)\qquad\text{Equation 5:}$$

In Equation 5, LCosc is a frequency (oscillation frequency) of the oscillation signal, fref is a reference frequency, N is the reference frequency (for example, 32 Khz) dividing ratio, and M is a resonance frequency dividing ratio.

As represented by Equation 5, dividing the oscillation frequency LCosc by the reference frequency fref means that a period of the reference frequency fref is counted using the oscillation signal LCosc. When the count value L_CNT is obtained in this manner, a low reference frequency fref may be used, and accuracy of the count may be increased.

The frequency digital converter (CDC) 710 may include a frequency down converter 711, a period timer 712, and a cascaded integrator-comb (CIC) filter circuit 713.

The frequency down converter 711 may receive a reference clock signal CLK_ref, which is a reference for a time period of a timer to be counted, and down-convert a frequency of the reference clock signal CLK_ref.

For example, the reference clock signal CLK_ref input to the frequency down converter 711 may be one of an oscillation signal LCosc and the reference frequency signal fref. casein an example where the reference clock signal CLK_ref is the oscillation signal LCosc input from the resonant circuit, a frequency of the oscillation signal LCosc may be down-converted, for example, to 'DOSC_ref=LCosc/M', where M may be externally set in advance.

In an example where the reference clock signal CLK_ref is the reference frequency signal fref, a frequency of the reference clock signal CLK_ref may be down-converted for example, to 'DOSC_ref=fref/N', where N may be externally set in advance.

In an example, the frequency down converter 711 may receive the reference frequency signal fref as the reference clock signal CLK_ref, and divide the reference clock signal CLK_ref using the reference frequency dividing ratio N to generate the divided reference clock signal DOSC_ref=CLK_ref/N, thereby down-converting a frequency of the reference frequency signal fref.

The period timer 712 may output a period count value PCV generated by counting one period time of the divided reference clock signal DOSC_ref received from the frequency down converter 711 using a sample clock signal CLK_spl. For example, the period timer 712 may receive the oscillation signal LCosc as the sample clock signal CLK_spl, and output the period count value PCV generated by counting one period time of the divided reference clock signal DOSC_ref received from the frequency down converter 711 using the sample clock signal CLK_spl.

In an example, the CIC filter circuit 713 may include a decimator CIC filter outputting the count value L_CNT generated by performing cumulative amplification on the period count value PCV received from the period timer 712.

The decimator CIC filter may perform the cumulative amplification on the period count value from the period timer using a cumulative gain determined based on a preset integral stage order, decimator factor, and comb differential delay order, and provide the cumulatively amplified period count value.

In another example, the CIC filter circuit 713 may include the decimator CIC filter and a first-order CIC filter. The first-order CIC filter may remove noise by taking a moving average of an output from the decimator CIC filter.

In an example, the decimator CIC filter may perform the cumulative amplification on the period count value from the period timer using a cumulative gain determined based on a preset integral stage order, decimator factor, and comb differential delay order, and provide the cumulatively amplified period count value.

Figure 16:
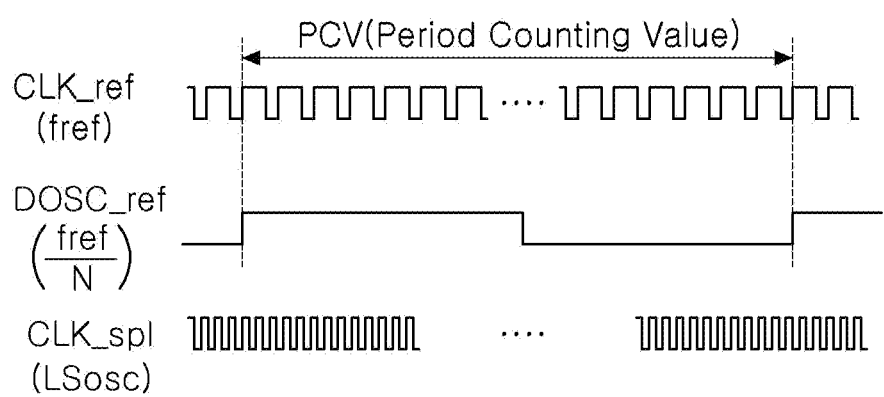
FIG. 16 illustrates an operation of a period timer, in accordance with one or more embodiments.

FIG. 16 illustrates an example of an operation of the period timer, in accordance with one or more embodiments.

Referring to FIG. 16, as described above, in the period timer 712, the reference clock signal CLK_ref may be one of the oscillation signal LCosc and the reference frequency signal fref. The reference frequency signal fref may be a signal by an external crystal and may be an oscillation signal by a phase locked loop (PLL), an RC circuit or the like inside an IC.

In an example, when the reference clock signal CLK_ref is the oscillation signal LCosc input from the resonant circuit, the sample clock signal CLK_spl may be the reference frequency signal fref. In this example, the divided oscillation signal may be 'LCosc/M'.

Alternatively, when the reference clock signal CLK_ref is the reference frequency signal fref, the sample clock signal CLK_spl may be the oscillation signal LCosc. In this example, the divided oscillation signal may be 'fref/N'.

Figure 17:
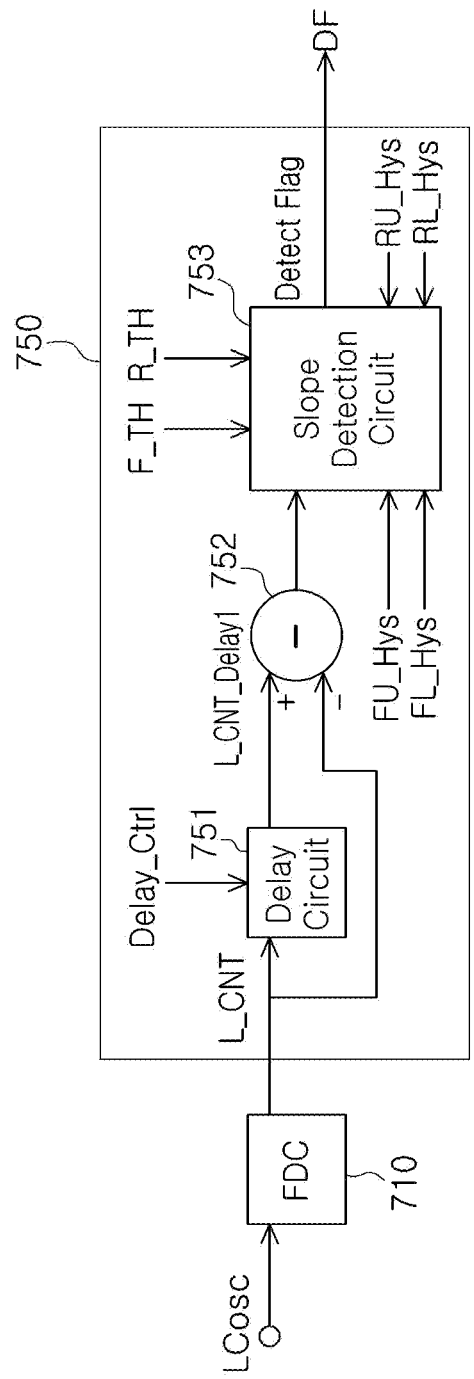
FIG. 17 illustrates an example of a touch detection circuit, in accordance with one or more embodiments.

FIG. 17 illustrates an example of the touch detection circuit, in accordance with one or more embodiments.

Referring to FIG. 17, the touch detection circuit 750 may detect each of a touch by a human body and a touch by a non-human body, for example, a conductor based on the count value input from the frequency digital converter 710.

In an example, the touch detection circuit 750 may differentiate the count value L_CNT received from the frequency digital converter 710 to generate a difference value Diff, compare the difference value Diff with each of a preset falling threshold value F_TH and a preset rising threshold value R_TH, and output the detection signals DF having different levels for identifying a touch by a human body or identifying a touch by a non-human body object based on a comparison result.

In an example, the touch detection circuit 750 may include a delay circuit 751, a subtraction circuit 752, and a slope detection circuit 753.

The delay circuit 751 may delay the count value L_CNT received from the frequency digital converter 710 for a predetermined time according to a delay control signal Delay_Ctrl, and output a delay count value L_CNT_Delay. A delay time may be determined according to the delay control signal Delay_Ctrl.

The subtraction circuit 752 may include at least one subtractor. The subtraction circuit 752 may subtract the count value L_CNT from the delay count value L_CNT_Delay, and output a difference value. In an example, the count value L_CNT may correspond to a currently counted value, and the delay count value L_CNT_Delay may correspond to a value counted before a predetermined delay time from a current time.

The slope detection circuit 753 may compare the difference value Diff received from the subtraction circuit 752 with each of the preset falling threshold value F_TH and the preset rising threshold value R_TH, and output the detection signal DF having a first level or a second level for identifying a touch by a human body input object, or identifying a touch by a non-human body input object based on the comparison result.

For example, the slope detection circuit 753 may compare the difference value Diff with the falling threshold value F_TH and the rising threshold value R_TH, and output the detection signal DF having the first level when the difference value Diff is smaller than the falling threshold value or output the detection signal DF having the second level when the difference value Diff is larger than the rising threshold value.

As an example, the slope detection circuit 753 may generate the detection signal Detect Flag having the first level meaning the touch by the human body when the difference value Diff falls and then rises, and generate the detection signal Detect flag having the second level meaning the touch by the non-human body object when the difference value Diff rises and then falls.

For example, upper and lower limit values FU_Hys and FL_Hys of falling hysteresis may be set and used on the basis of the falling threshold F_TH. Upper and lower limit values RU_Hys and RL_Hys of rising hysteresis may be set and used on the basis of the rising threshold value R_TH.

When the difference value Diff for a slope is used as described above, an error for a temperature drift may be prevented, and when a falling section F_TH: FU_Hys and FL_Hys and a rising section R_TH: RU_Hys and RL_Hys are used, touch detection accuracy may be improved.

As a result, the touch detection circuit 750 may compare a change of the frequency to confirm whether the sensing manner is the inductive sensing or the capacitive sensing. As described above, in the capacitive sensing, a capacitance may be increased, such that the frequency may be decreased, and in the inductive sensing, an inductance may be reduced, such that the frequency may be increased.

Figure 18:
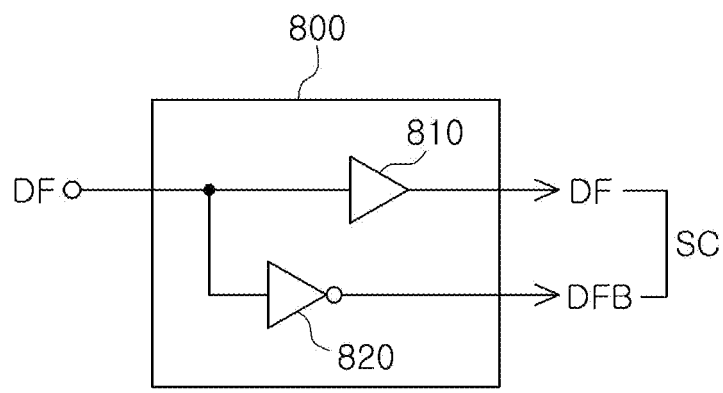
FIG. 18 illustrates an example of a control circuit, in accordance with one or more embodiments.

FIG. 18 illustrates an example of the control circuit, in accordance with one or more embodiments.

Referring to FIG. 18, the control circuit 800 may confirm the sensing manner based on the detection signal DF, and generate the control signal SC: DF and DFB based on the confirmed sensing manner.

In an example, the control circuit 800 may include a buffer 810 that transfers the DF signal to an output terminal and an inverter 820 that inverts the DF signal and outputs the DFB signal.

The control signal SC: DF and DFB may include a first control signal SC1: DF=H and DFB=L for low current control at the time of the input of a touch by a human body, and may include a second control signal SC2: DF=L and DFB=H for high current control at the time of the input of a touch by a non-human body object.

In an example, the control circuit 800 may generate the control signal DF or DFB for controlling the operating current of the current variable oscillation circuit 600 (FIG. 12) based on the detection signal DF from the touch detection circuit 750, and provide such a control signal to the current variable oscillation circuit 600 to control regulation of a resonant current according to the sensing manner.

Figure 19:
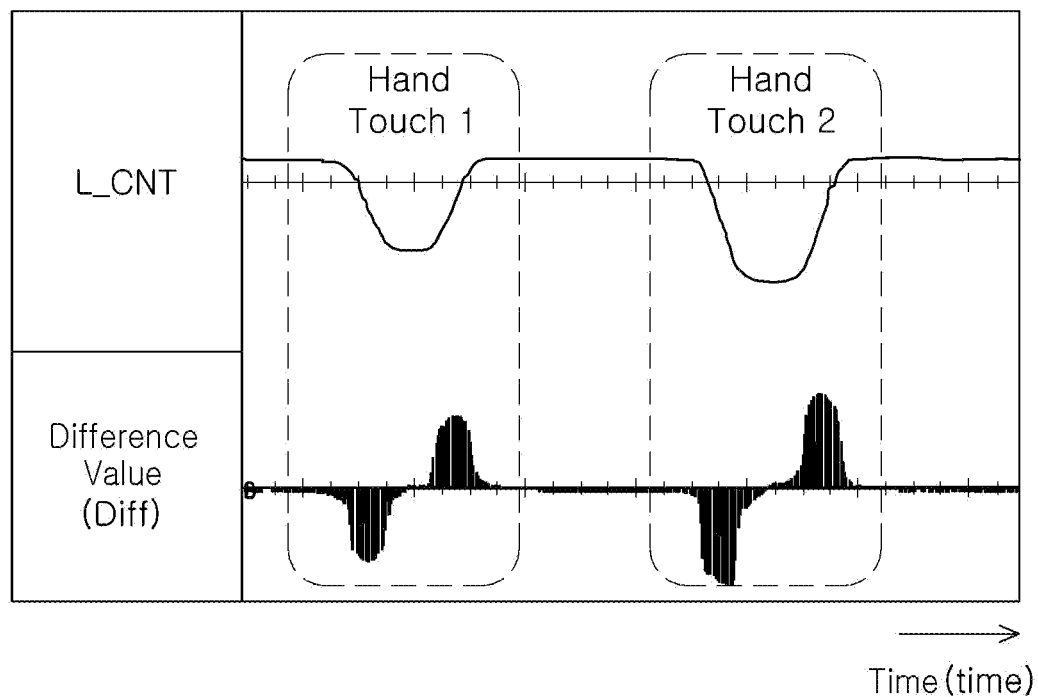
FIG. 19 illustrates an example of a count value and a difference value at the time of the touch by the human body, in accordance with one or more embodiments.
Figure 20:
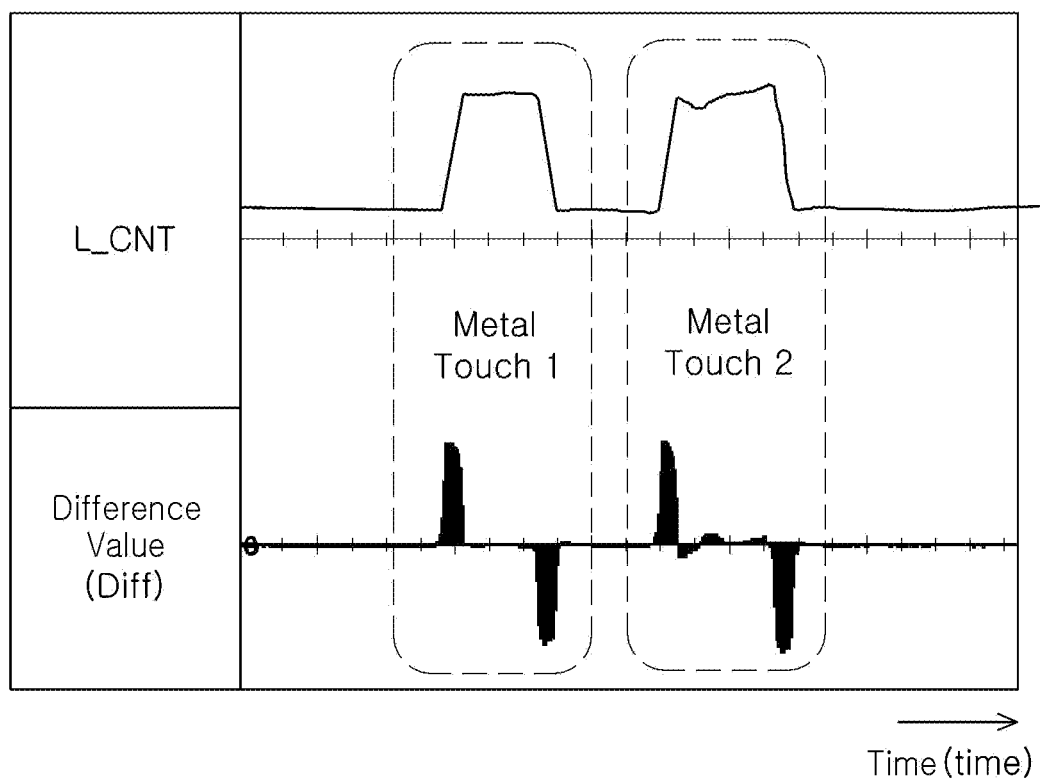
FIG. 20 illustrates an example of a count value and a difference value at the time of the touch by the non-human body object, in accordance with one or more embodiments.

FIG. 19 illustrates an example of a count value and a difference value at the time of the input of a touch by a human body, and FIG. 20 illustrates an example of a count value and a difference value at the time of the input of a touch by a non-human body object.

FIG. 19 illustrates examples of waveforms of a count value L_CNT and a difference value, which is a slope variance, measured in an example where the first coil element mounted beneath the first switch member is touched by a human body (for example, a hand), and FIG. 20 illustrates examples of waveforms of a count value L_CNT and a difference value, which is a slope variance, measured in an example where the first coil element is touched by the conductor (for example, a metal).

Referring to FIG. 19, in an example where the first switch member on the first coil element is touched by a human body (for example, a hand), an operation is performed in the capacitive manner, such that the count value L_CNT is decreased, and in an example where the first switch member on the first coil element is not touched by a human body (for example, a hand), the count value L_CNT is increased to an original state. It may be confirmed that if the difference value is confirmed on the basis of such a phenomenon, the difference value falls when the first switch member is touched by a human body and rises when the first switch member is not touched by a human body, for example, when the first switch member is touched by a non-human object.

It may be seen that the slope variance appears as a pair, that is, a rising slope after a falling slope, when the first switch member is touched by a human body, as described above.

In contrast, referring to FIG. 20, in an example where the first switch member on the first coil element is touched by a conductor (for example, metal), an operation is performed in the inductive manner, such that the count value L_CNT is increased, and in an example where the first switch member on the first coil element is not touched by a conductor (for example, metal), the count value L_CNT is decreased to an original state.

It may be seen that the slope variance appears as a pair, that is, a falling slope after a rising slope, when the first switch member is touched by the conductor (for example, a metal), as described above.

That is, in an example where the first switch member on the first coil element is touched by a human body (for example, a hand) or a conductor (for example, a metal), the slope variance appears as a pair of the falling slope and the rising slope, and orders in which the falling slope and the rising slope appear are different from each other based on the determined input touch object.

Referring to waveforms of the slope variances of FIGS. 19 and 20, it may be seen that the slope variances appear as a pair, and the slope falls and then rises in the capacitive sensing and rises and falls in the inductive sensing.

Figure 21:
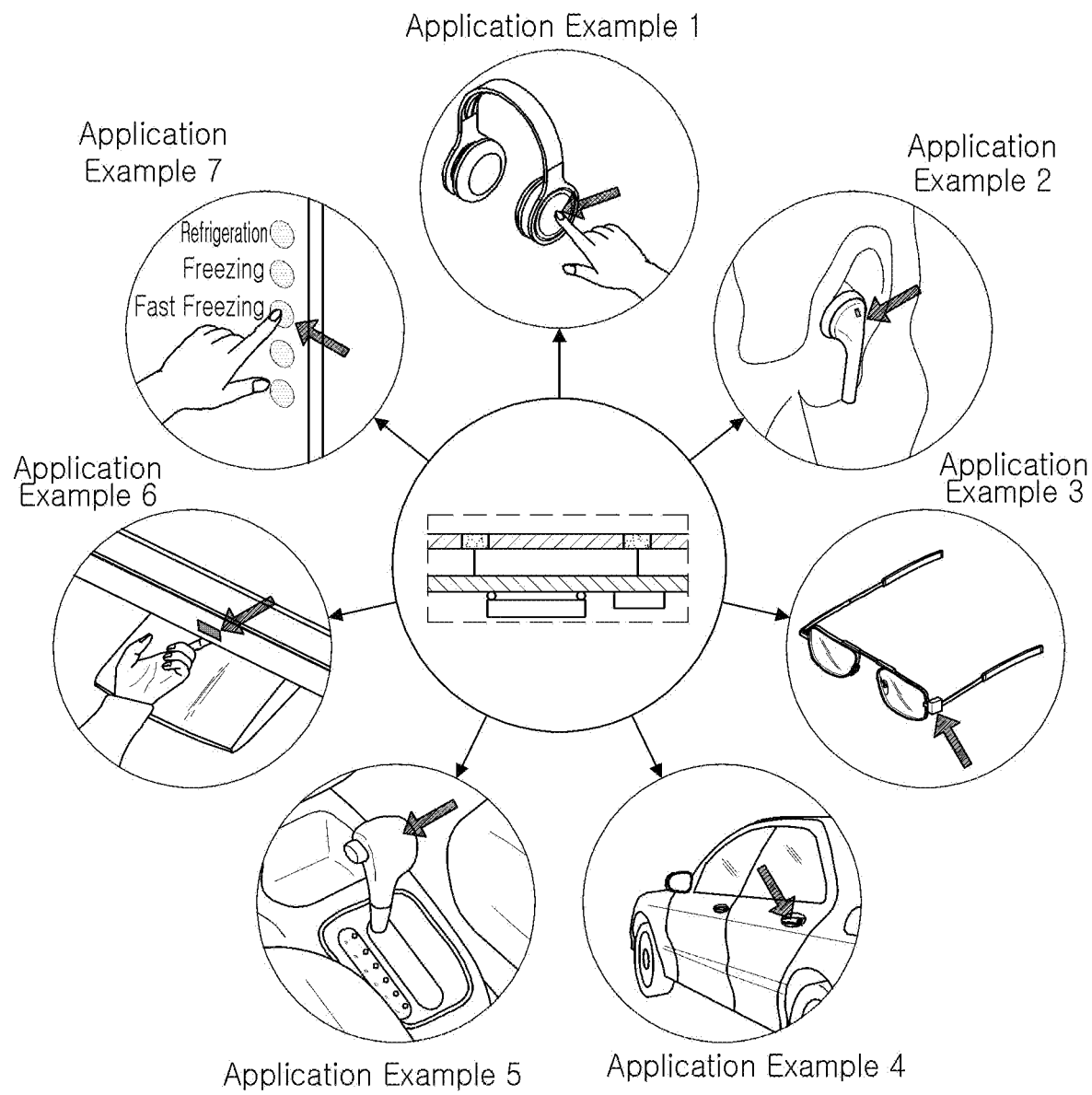
FIG. 21 illustrates an application example of the switching operation sensing apparatus, in accordance with one or more embodiments.

FIG. 21 illustrates an example of the switching operation sensing apparatus, in accordance with one or more embodiments.

FIG. 21 illustrates Examples 1 to 7 of the switching operation sensing apparatus, in accordance with one or more embodiments.

Example 1 of FIG. 21 may be an example in which the switching operation sensing apparatus may replace an operation control button of a Bluetooth headset, and Example 2 of FIG. 21 is an example in which the switching operation sensing apparatus may replace an operation control button of a Bluetooth earpiece. In an example, the switching operation sensing apparatus may replace the on/off power switches of the Bluetooth headset and the Bluetooth earpiece.

Example 3 of FIG. 21 is an example in which the switching operation sensing apparatus may replace an operation control button of glasses. In an example, the switching operation sensing apparatus may replace a button that performs a function such as a phone operation, an e-mail operation, a home button operation, or similar operations, of an apparatus such as Google glasses, virtual reality (VR), augmented reality (AR), and the like.

Example 4 of FIG. 21 is an example in which the switching operation sensing apparatus may replace a door lock button of a vehicle. Example 5 of FIG. 21 is an example in which the switching operation sensing apparatus may replace a smart-key button of a vehicle. Example 6 of FIG. 21 is an example in which the switching operation sensing apparatus may replace an operation control button of a computer. Example 7 of FIG. 21 is an example in which the switching operation sensing apparatus may replace an operation button for operation control of a refrigerator. Examples 1-7 in FIG. 21 are non-limiting examples, and other applications of the switching operation sensing apparatus may be implemented.

Additionally, as non-limiting examples, the switching operation sensing apparatus may replace volume and power switches of a laptop computer, switches of VR, a head mounted display (HMD), a Bluetooth earphone, a stylus touch fan, or the like, and may replace buttons of monitors of home appliances, a refrigerator, a laptop computer, and the like.

For example, an operation control button may be disposed to be integrated, or may be integrally formed, with a cover, a frame, or a housing of a device to which the switching operation sensing apparatus is applied, and may be used to perform power on/off operations, volume adjustment, and other specific functions (back, movement to home, lock, and the like).

Additionally, a plurality of touch switches may be included to perform a plurality of functions in performing the corresponding functions (back, movement to home, lock, and the like).

Additionally, the touch switches described above may be applied to an electrical device requiring the touch switches, and may replace volume and power switches of a laptop computer, switches of VR, an HMD, a Bluetooth earphone, a stylus touch fan, or the like, and may replace buttons of monitors of home appliances, a refrigerator, a laptop computer, and the like.

The touch switch according to the examples is not limited to being applied to the devices described above, and may be applied to devices such as a mobile device, a wearable device, and the like, having switches. Additionally, an integrated design may be implemented by applying the touch switch according to the present disclosure.

According to an example, corresponding sensing manner of dual sensing (capacitive sensing and inductive sensing) is confirmed using a switch member integrated, or integrally formed, with a housing of an electrical device, and an operating current is regulated so as to be suitable for the corresponding sensing manner, such that a current may be adaptively regulated, current consumption may be reduced, and a relative low power system may be implemented.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A switching operation sensing apparatus to be applied to an electronic device having an input operation unit comprising a first detector disposed in a housing, the switching operation sensing apparatus comprising:
   a current variable oscillation circuit configured to generate an oscillation signal having a frequency that varies based on a change in a capacitance from a touch on a surface of the input operation unit by a human body, or a change in an inductance from a touch on the surface of the input operation unit by a non-human body, and regulate an operating current in response to a control signal;
   an input operation detection circuit configured to identify the touch to be from the human body touch, and identify the touch to be from the non-human body touch based on characteristics of the varied frequency, and generate detection signals having different levels based on the identification of the touch; and
   a control circuit configured to determine a capacitive sensing or an inductive sensing based on the detection signals and generate the control signal to regulate the operating current based on the determined capacitive sensing or the determined inductive sensing.

2. The apparatus of claim 1, wherein the operation detection circuit comprises:
   a frequency digital converter configured to convert the oscillation signal into a count value; and
   a touch detection circuit configured to identify the human body touch and identify the non-human body touch based on the count value, and generate the detection signals having the different levels based on the identification of the touch.

3. The apparatus of claim 2, wherein the frequency digital converter is further configured to generate the count value by counting a reference clock signal based on the oscillation signal.

4. The apparatus of claim 2, wherein the input operation unit further comprises a second detector integrally formed with the housing, and disposed at a position different from a position of the first detector, and
   wherein the first detector and the second detector are formed of a same material as a material of the housing.

5. The apparatus of claim 2, wherein the current variable oscillation circuit comprises:
   a current regulator configured to regulate the operating current in response to the control signal; and
   an oscillator configured to receive the regulated operating current, generate an oscillation signal having a first frequency characteristic wherein a resonance frequency rises and then falls when the first detector is touched by the human body, and generate an oscillation signal having a second frequency characteristic wherein a resonance frequency rises and then falls when the first detector is touched by the non-human body object.

6. The apparatus of claim 5, wherein the oscillator comprises:
   an inductance circuit comprising a first coil element disposed inside the first detector and having an inductance that varies when the non-human body touch is input to the first detector; and
   a capacitance circuit comprising a capacitor element connected to the inductance circuit and having a capacitance that varies when the human body touch is input to the first detector.

7. The apparatus of claim 5, wherein the current regulator comprises:
   a first inverter circuit connected to the oscillator, having a first gm-cell, and enabled at a time of the touch from the human body;
   a second inverter circuit connected in parallel with the first inverter circuit, having a second gm-cell larger than the first gm-cell, and enabled at a time of the touch from the non-human body;
   a first resistor connected between a connection node between the first inverter circuit and the second inverter circuit and a first end of the oscillator; and
   a first switch connected in parallel with the first resistor, wherein the first switch is turned off at the time of the touch from the human body, and turned on at the time of the touch from the non-human body.

8. The apparatus of claim 5, wherein the current regulator comprises a mirror transistor and a current source connected between a terminal of a power supply voltage and a ground,
the mirror transistor is connected between the terminal of the power supply voltage and the current source to form a current mirror with the oscillator, and
the current source is connected between the terminal of the power supply voltage and the mirror transistor, or between the mirror transistor and the ground, and generates a variable current based on the control signal.

9. The apparatus of claim 5, wherein the current regulator comprises:
an amplitude detection circuit configured to detect amplitudes of differential signals of the oscillator and output first and second detected voltages; and
an error amplifier circuit configured to control the operating current of the oscillator based on an error voltage between the first and second detected voltages of the amplitude detection circuit.

10. The apparatus of claim 9, wherein the amplitude detection circuit comprises:
a first amplitude detection circuit configured to detect an amplitude of a positive signal of the differential signals of the oscillator and output the first detected voltage from a common source of first and second N-channel field effect transistors (FETs); and
a second amplitude detection circuit configured to detect an amplitude of a negative signal of the differential signals of the oscillator and output the second detected voltage from a common source of first and second P-channel FETs.

11. The apparatus of claim 2, wherein the frequency digital converter is configured to:
divide a reference frequency signal based on a reference frequency dividing ratio to generate a divided reference clock signal;
divide the oscillation signal from the current variable oscillation circuit based on a sensing frequency dividing ratio; and
output a count value generated by counting the divided reference clock signal using the divided oscillation signal.

12. The apparatus of claim 2, wherein the frequency digital converter comprises:
a frequency down converter configured to receive a reference frequency signal as a reference clock signal, divide the reference clock signal based on a reference frequency dividing ratio to generate a divided reference clock signal, and down-convert a frequency of the reference frequency signal;
a period timer configured to receive the oscillation signal as a sample clock signal and output a period count value generated by counting one period time of the divided reference clock signal received from the frequency down converter using the sample clock signal; and
a cascaded integrator-comb (CIC) filter circuit configured to output the count value generated by performing cumulative amplification on the period count value received from the period timer.

13. The apparatus of claim 2, wherein the touch detection circuit is further configured to:
differentiate the count value to generate a difference value;
compare the generated difference value with each of a preset falling threshold value and a preset rising threshold value; and
output the detection signals having the different levels to identify the human body touch or the non-human body touch based on a result of the comparing.

14. The apparatus of claim 2, wherein the touch detection circuit comprises:
a delay circuit configured to delay the count value by a time that is determined based on a delay control signal, and output a delay count value;
a subtraction circuit configured to output a difference value generated by subtracting the count value from the delay count value from the delay circuit; and
a slope detection circuit configured to compare the difference value received from the subtraction circuit with each of a preset falling threshold value and a preset rising threshold value, and output the detection signal having a first level or a second level for identifying the touch by the human body or the touch by the non-human body object based on a result of the comparing.

15. The apparatus of claim 14, wherein the slope detection circuit is configured to generate the detection signal having the first level corresponding to the human body touch when the difference value falls and then rises, and generate the detection signal having the second level corresponding to the non-human body touch when the difference value rises and then falls.

16. The apparatus of claim 15, wherein the control circuit is configured to output the control signal including a first control signal for low current control at a time of the human body touch, and output the control signal including a second control signal for high current control at a time of the non-human body touch.

17. The apparatus of claim 1, wherein the apparatus is any one of a Bluetooth headset, a Bluetooth earpiece, smart glasses; a virtual reality (VR) headset, an Augmented Reality (AR) headset, a laptop, a computer, a smart phone, an entrance key of a vehicle, and a stylus touch pen.

18. An apparatus to be applied to an electronic device having an input operation unit comprising a detector disposed in a housing of the apparatus, the apparatus comprising:
a current variable oscillation circuit configured to generate an oscillation signal based on a reactance of a touch to the detector, and
a control circuit configured to generate an operational signal based on a detected frequency characteristic of the oscillation signal, and regulate an operating current based on the generated operational signal.

19. The apparatus of claim 18, wherein the touch is detected to be a human body touch based on a change in a capacitance from the touch to the detector, and the touch is detected to be a non-human touch based on a change in an inductance from the touch to the detector.

20. The apparatus of claim 19, further comprising an input operation detection unit configured to generate a first detection signal of a first frequency level that identifies the human body touch, and generates a second detection signal of a second frequency level that identifies the non-human touch, wherein the first frequency level is different from the second frequency level.

* * * * *